(12) United States Patent
Nakahira

(10) Patent No.: US 6,873,796 B1
(45) Date of Patent: Mar. 29, 2005

(54) NODE DEVICE AND OPTICAL PATH SETTING METHOD

(75) Inventor: Yoshihiro Nakahira, Hachioji (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 534 days.

(21) Appl. No.: 09/612,304

(22) Filed: Jul. 7, 2000

(30) Foreign Application Priority Data

Jul. 28, 1999 (JP) .......................................... 11/213186

(51) Int. Cl.⁷ .............................................. H04J 14/00
(52) U.S. Cl. ............................. 398/51; 398/49; 398/50; 398/54; 398/56; 398/58; 370/351; 370/355
(58) Field of Search ............................... 398/49–51, 54, 398/56, 58; 370/315–356; 359/123, 117, 128, 139, 118, 110; 709/249–250; 714/4

(56) References Cited

U.S. PATENT DOCUMENTS 5,303,078 A * 4/1994 Brackett et al. ............ 359/139
5,956,165 A * 9/1999 Fee et al. .................... 359/118
6,535,313 B1 * 3/2003 Fatehi et al. ................ 359/139
2003/0145246 A1 * 7/2003 Suemura ........................ 714/2

* cited by examiner

Primary Examiner—Kinfe-Michael Negash
(74) Attorney, Agent, or Firm—Venable. LLP; James R. Burdett

(57) ABSTRACT

A method for setting a cut-through optical path in an optical network system is proposed. Each node device inquires of node devices adjacent to the present node device about connection information on the present node device and connection information on the node devices adjacent to the present node device each time a predetermined time elapses or each time a predetermined event is generated. When the inquiry is received from the node device adjacent to the present node device, the present node device responds with the connection information and/or traffic information on the present node device and the connection information on the node device adjacent to the present node device. Then, each node device controls an optical switch based on the connection information on the entire optical network system obtained by the above inquiry and sets an optical path which omits the packet processing functions for layer 3 systems of the node device which the node control device controls when a cut-through setting packet is received or based on self judgment.

28 Claims, 15 Drawing Sheets

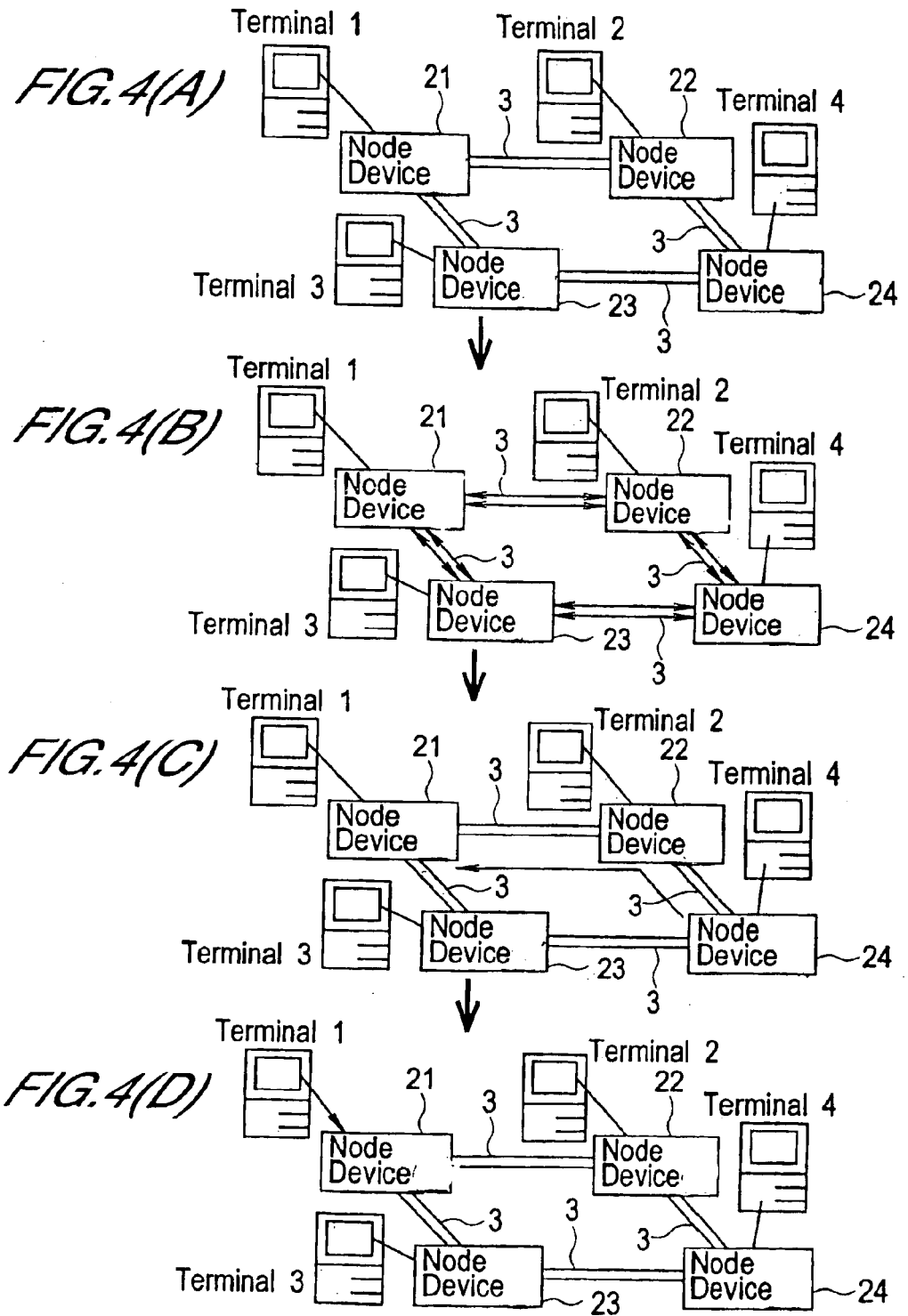

NODE DEVICE AND OPTICAL PATH SETTING METHOD

BACKGROUND OF THE INVENTION

1. Field of the Invention

The present invention relates to a node control device, node device and optical path setting method suitable for establishing an optical network system.

2. Description of Related Art

FIG. 1 shows an aspect of a conventional optical network system. As FIG. 1 shows, the optical network system comprises user terminals 110 connected to routers (or a packet switching machine) 100 and optical cross-connects (OXC) or optical add-drop-multiplexer (OADM) 130 which are connected with the router 100 and are inter-connected via inter-office optical fibers 120. The optical cross-connect 130 is an device for executing the relay/insertion (adding)/extraction (dropping) of optical signals and the setting connection of optical signals (that is, optical path) 140 between two node devices which are not necessarily adjacent to each other.

Some of the optical cross-connects 130 do not use wavelength division multiplexing transmission technology, but as a result of recent research findings, many optical cross-connects use a wavelength division multiplexing transmission technology (or time division multiplex technology, or code division multiplex technology) where a plurality of optical signals are sent over one optical fiber, and these multiplexed signals are used as a resource for transmission so as to increase capacity. Actually, the optical cross-connects 130 in FIG. 1 can multiplex a plurality of optical signals having different wavelengths using wavelength multiplexers/demultiplexers and optical spatial switches. An interface 150 is disposed between the router 100 or electronic switching machine (for example, SDH systems or ATM systems) and the optical cross-connect shown in FIG. 1. For this interface 150, wavelength variable (or fix) type O/O (optical/optical) or E/O (Electric/Optical) conversion device and O/E (Optical/Electric) conversion device are used.

Next a packet transmission aspect implemented on such an optical network system will be explained. At first, a packet sent from a user terminal 110 is transmitted to the router 100 via the transmission path. The router 100 analyzes the header of this packet, and transfers the packet to an input interface 150 of the optical path (connection of optical signals) 140 which is set between interfaces of OXCs, where the destination terminal is connected to or an appropriate router for relaying. By repeating such an operation (packet relay by routers), the transfer target packet reaches the router 100 accommodating the destination user terminal, and is transferred to the destination user terminal 110 via this router.

The optical path 140 shown in FIG. 1 is set by the optical cross-connect (e.g. optical ADM (Add/Drop Multiplexer)) 130 and the optical fiber 120. The input/output interface 150 is disposed between the optical cross-connect 130 and the packet switching machine (e.g. router, electronic switching machine) 100.

Setting of the optical path 140 in the above mentioned optical network system, however, is semi-fixed. So a method for dynamically setting this optical path 140 according to the traffic is under current study.

It is accordingly the first object of the present invention to provide an optical path setting method for dynamically setting an optical path according to the traffic.

It is a second object of the present invention to provide a node control device for such an optical path setting.

It is the third object of the present invention to provide a node device having such a node control device.

SUMMARY OF THE INVENTION (A) To achieve these objects, the first configuration example of the node control device of the present invention is a node control device which is disposed in each node device constituting an optical network system, and is used for controlling the packet transfer operation in each node device, comprising the following means.

The node control device comprises: (1) connection information response means for inquiring of node devices adjacent to a node device which the node control device controls (hereafter the present node device) about the connection information (sometimes include traffic information) on the present node device and connection information on the node device adjacent to the present node device each time a predetermined time elapses or a predetermined event is generated, and for responding with the connection information on the present node device and the connection information on the node device adjacent to the present node device when the present node device receives the above inquiry from the node device adjacent to the present node device; and (2) optical path setting means for controlling optical switches based on the connection information on the entire optical network system obtained using the connection information response means when a cut-through setting packet is received or based on self judgment and setting an optical path which omits the layer 2 and layer 3 processing in the present node device.

In this way, according to the present invention, each node control device constituting the optical network system can set the optical path which omits the layer 2 and layer 3 processing in the node device, the node device being controlled by the node control device, according to the cut-through setting packet which the node control device received, or by the determination of the node control device itself. Therefore, transfer efficiency of user packets can be improved and processing delay can be decreased by the dynamic allocation of optical paths through which the loading due to the layer 2 and layer 3 processing is reduced.

(B) According to the second configuration of the node control device of the present invention, it is preferable that the node control device according to the first configuration further comprises cut-through optical path necessary/unnecessary determination means for determining the necessity of cut through before transmitting a cut-through request packet or transmitting a cut-through setting packet, and selectively setting the cut-through optical path only when determined as necessary. This function can prevent the setting of a cut-through optical path for a small volume of packets, so as not to waste resources.

(C) According to the third configuration of the node control device of the present invention, it is preferable that the node control device according to the first and second configurations further comprises information channel insuring means for determining whether the information channel is insured after setting the cut-through optical path between the node devices on the route where the cut-through optical path is set before transmitting the cut-through setting packet, and setting the cut-through optical path only when the information channel is insured. This function can prevent a state where information cannot be exchanged between the node devices on the optical path route after setting the cut-through optical path.

(D) According to the first configuration of the node device of the present invention, a node device comprises: (1) a router (layer 3 system) for determining an output destination of a transfer packet which is input according to the header information; (2) an optical cross-connect for setting an optical path between arbitrary input/output optical fibers by relaying optical signals, extracting (dropping) optical signals from an optical fiber or inserting (adding) optical signals into an optical fiber; and (3) a node control device according to the above mentioned first or second configuration for switching the route of optical paths in the optical cross-connect according to the instructions of the received transfer packet or based on self judgment.

By using such a configuration for the node device, the node device of the present invention can implement such effects as improving transfer efficiency, decreasing of processing delay and insuring the information channel, therefore, transfer efficiency of user packets can be improved and processing delay can be decreased by the dynamic allocation of optical paths through which the loading due to the layer 2 and layer 3 processing is reduced.

(E) According to the second configuration of the node device of the present invention, it is preferable that the node device according to the first configuration further comprises a switch which connects a destination-based buffer to some of the outputs from the router to the optical cross-connect, and can connect a packet read from the destination-based buffer to an arbitrary input port of the optical cross-connect. This configuration can improve communication efficiency using the cut-through optical path, therefore, transfer efficiency of user packets can be improved and processing delay can be decreased by the dynamic allocation of optical paths through which the loading due to the layer 2 and layer 3 processing is reduced.

(F) According to the third configuration example of the node device of the present invention, it is preferable that the node device according to the above mentioned second configuration further comprises allowable delay recognition function means at the router for determining the allowable delay of a transfer packet, so that only packets with a large allowable delay are allowed to be output to the destination-based buffer and packet with a small allowable delay are directly output to the optical cross-connect or destination-based buffer prepared for small delay packets. By this configuration, a state where a packet with a small allowable delay time, such as a real-time type packet, is erroneously stored in the destination-based buffer can be prevented, and the deterioration of communication quality can be effectively prevented. As another implementation, buffers are prepared for allowable packet loss ratio or other QoS parameters.

(G) According to the fourth configuration of the node device, a node device comprises: (1) a router for determining an output destination of a transfer packet which is input according to the header information; (2) an optical cross-connect for setting an optical path between arbitrary input/output optical fibers by extracting (dropping) optical signals from an optical fiber, inserting (adding) optical signals into an optical fiber or relaying optical signals; (3) the node control device according to the above mentioned first or second configuration for switching the route of optical paths in the optical cross-connect according to the instructions of the received transfer packet or based on self judgment; and (4) optical path extraction (dropping)/insertion (adding) means for the information channel for extracting optical signals with a fixed wavelength insured for the information channel from the optical fiber, or for inserting the optical signals with a fixed wavelength into the optical fiber, so as to enable communication of information signals with another node device.

By using such a configuration for the node device, the node device of the present invention can implement such effects as improving transfer efficiency, decreasing the processing delay and insuring the information channel, therefore, transfer efficiency of user packets can be improved and processing delay can be decreased by the dynamic allocation of optical paths through which the loading due to the layer 2 and layer 3 processing is reduced.

(H) According to the fifth configuration of the node device of the present invention, a node device comprises: (1) a router for determining an output destination of a transfer packet which is input according to the header information; (2) an optical cross-connect for setting an optical path between arbitrary input/output optical fibers by extracting (dropping) optical signals from an optical fiber, inserting (adding) optical signals into an optical fiber or relaying optical signals; (3) the node control device according to one of the above mentioned first or second configurations for switching the optical paths in the optical cross-connect according to the instructions of the received transfer packet or based on self judgment; and (4) pilot tone signal super-imposing (overlaying)/receiving means for the information channel for super-imposing (overlaying) pilot tone signals for the information channel on an optical path for user data or separating pilot tone signals for the information channel from the optical path for user data so as to enable communication of information signals with another node device.

By using such a configuration for the node device, the node device of the present invention can implement such effects as improving transfer efficiency, decreasing processing delay and insuring the information channel, therefore, transfer efficiency of user packets can be improved and processing delay can be decreased by the dynamic allocation of optical paths through which the loading due to the layer 2 and layer 3 processing is reduced.

(I) According to the sixth configuration example of the node device of the present invention, in the node device according to the above mentioned fourth configuration, control information is transmitted by a time division multiplex system using the pilot tone signals for the information channel. This can eliminate the potential collision of pilot tones.

(J) According to the optical network system of the present invention, an optical network system is comprised of a plurality of node devices disposed according to one of the above mentioned first to sixth configurations, so that such effects as improving transfer efficiency, decreasing processing delay and insuring the information channel can be implemented, therefore, transfer efficiency of user packets can be improved and processing delay can be decreased by the dynamic allocation of optical paths through which the loading due to the layer 2 and layer 3 processing is reduced.

(K) According to the first configuration of the optical path setting method, an optical path setting method in an optical network system comprises: (1) a step where each node device inquires of node devices adjacent to the present node device about connection information (sometimes including traffic information) on the present node device and connection information on the node device adjacent to the present node device each time a predetermined time elapses or a predetermined event is generated, and the present node device responds with the connection information on the present node device and the connection information on the node devices adjacent to the present node device when the present node device receives the inquiry, and (2) a step where each node device controls optical switches based on the connection information on the entire optical network system which each node device obtained in the above step when a cut-through setting packet is received or based on self judgment, and sets an optical path which cuts through packet processing done in the higher layer of the node device which the node control device controls.

This can improve transfer efficiency and decrease the processing delay of the user packet, therefore, transfer efficiency of user packets can be improved and processing delay can be decreased by the dynamic allocation of optical paths through which the loading due to the layer 2 and layer 3 processing is reduced.

(L) According to the second configuration of the optical path setting method of the present invention, it is preferable that, in the optical path setting method according to the above mentioned first configuration, it is determined whether the information channel is insured after setting the cut-through optical path between the node devices on the route where the cut-through optical path is set before the setting of the cut-through optical path, and the cut-through optical path is set only when the information channel is insured. By this, a state where information cannot be exchanged between the node devices on the cut-through optical path route after setting the cut-through optical path can be absolutely prevented.

(M) According to the third configuration of the optical path setting method of the present invention, it is preferable that, in the optical path setting method according to the above mentioned first or second configuration, a packet read from the destination-based buffer is transmitted to the cut-through optical path after setting. This can improve communication efficiency using the cut-through optical path.

(N) According to the fourth configuration of the optical path setting method of the present invention, it is preferable that, in the optical path setting method according to the above mentioned third configuration, packets are stored based on their destination or their class (class; allowable-delay or packet loss ratio) in the destination-based buffer. This can prevent a state where a packet with a small allowable delay time, such as a real-time type packet, is stored long time in the destination-based buffer, and the deterioration of communication quality can be effectively prevented.

(O) According to the fifth configuration of the optical path setting method of the present invention, it is preferable that, in the optical path setting method according to the above mentioned first, third and fourth configuration, the information communication between the node devices, where the cut-through optical path is set, is implemented by using optical signals with a wavelength insured for the information channel after the cut-through optical path is set. This can always insure the information channel after the cut-through optical path is set.

(P) According to the sixth configuration of the optical path setting method of the present invention, it is preferable that, in the optical path setting method according to the above mentioned first, third and fourth configuration, the information communication between the node devices, where the cut-through optical path is set, is implemented by superimposing (overlaying) the pilot tone signals for the information channel on the optical path for user data. This can always insure the information channel even if the cut-through optical path is set.

(Q) According to the seventh configuration of the optical path setting method of the present invention, it is preferable that, in the optical path setting method according to the above mentioned sixth configuration, the pilot tone signals for the information channel are transmitted by the time division multiplex system. This can eliminate the potential collision of pilot tones.

BRIEF DESCRIPTION OF THE DRAWINGS

The foregoing and other objects, features and advantages of the present invention will be better understood from the following description taken in connection with accompanying drawings, in which:

FIG. 4 (including FIGS. 4(A)–4(D)) is a drawing for explaining an example of setting of a cut-through optical path in accordance with the present invention;

DESCRIPTION OF THE PREFERRED EMBODIMENTS (A) Configuration of Optical Network System FIG. 3 shows an embodiment of the optical network system in accordance with the present invention. As FIG. 3 shows, this optical network system comprises node devices 2 to which one or more terminals 1 are connected, and optical fibers 3 which interconnect these node devices 2. Although FIG. 3 shows the case when the optical network is created in a net configuration, the optical network can also be created in a loop or other configuration.

In this optical network system, node devices in accordance with embodiments to be discussed later are used for the node device 2. The node device 2 comprises three functional parts: a router 2A, a node control function part 2B for controlling the operation of the node device in general, and an optical cross-connect 2C.

These three functional parts need not be disposed in a single housing, but may be disposed in separate housings respectively. In the following description, a device which implements the optical path setting function, which is implemented by linking these three functional parts, is called the "node device".

In the following description, when it is necessary to distinguish the node device having a configuration unique to the present invention from an ordinary node device which is generally used, the node device having the configuration unique to the present invention is called the "IP (Internet Protocol)/optical multi-layer switch node device".

Now various embodiments will be described in sequence, taking an example in which the node device, node control device and the optical path setting method in accordance with the present invention are implemented as an IP/optical multi-layer switch node.

(B) First Embodiment (B-1) Functional Configuration

Figure 1:
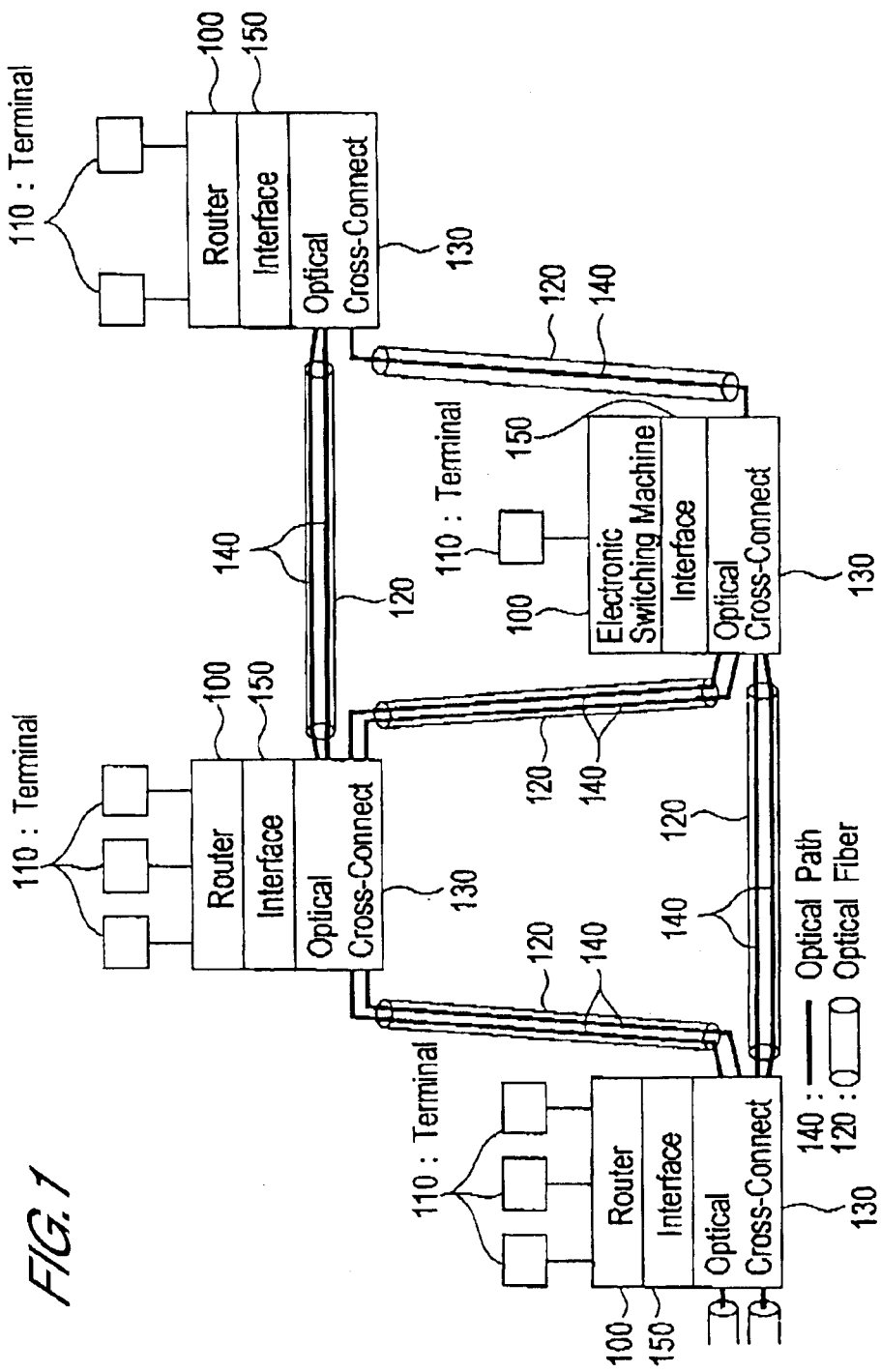
FIG. 1 is a drawing depicting a prior art optical network system.
Figure 2:
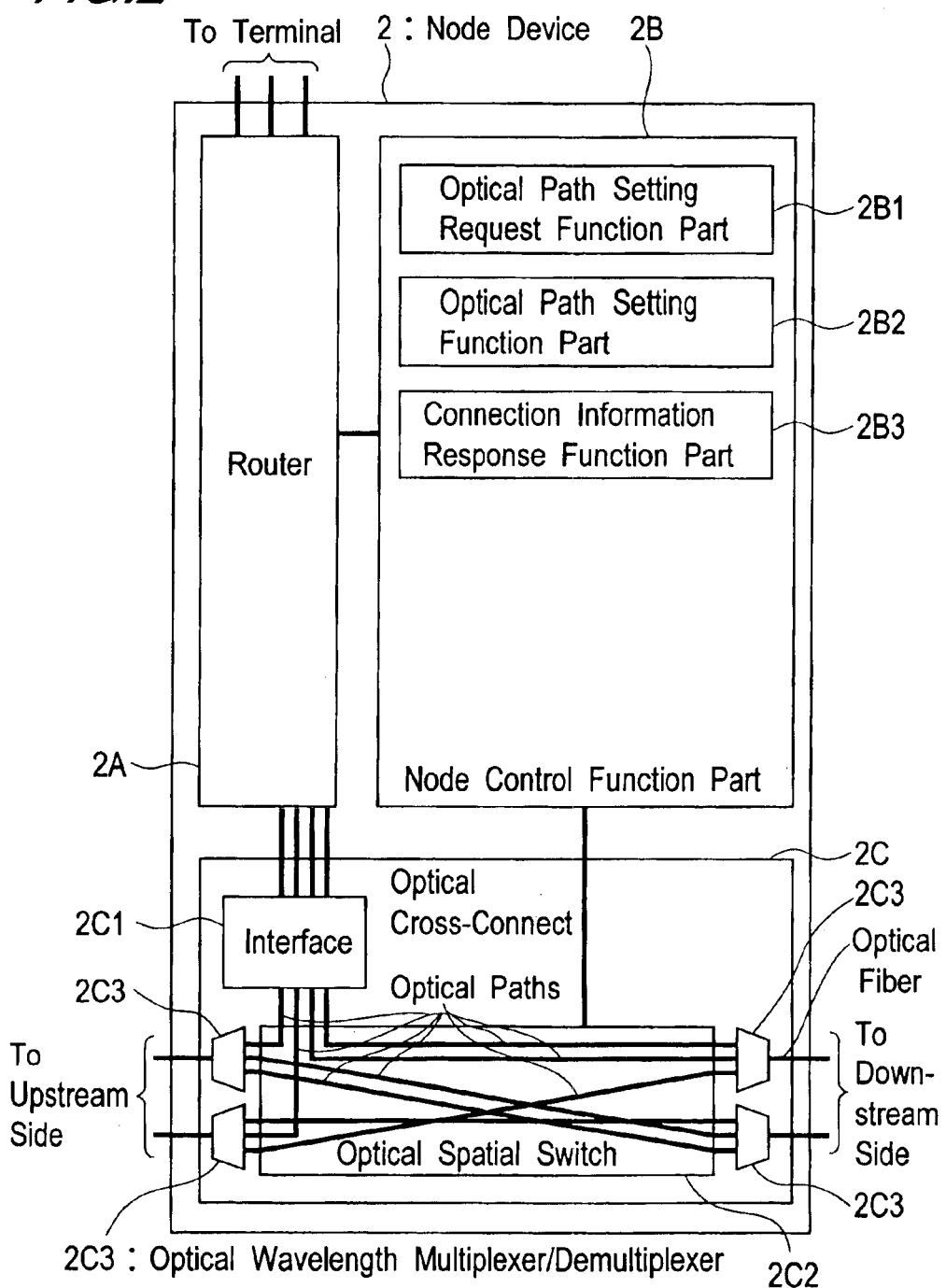
FIG. 2 is a functional block diagram depicting a first embodiment of the node device in accordance with the present invention.

FIG. 2 shows a functional configuration of the node device in accordance with the first embodiment. As FIG. 2 shows, or as the above description explains, the node device 2 comprises a router 2A, a node control function part 2B and an optical cross-connect which is called as an optical XC (OXC) 2C. The node control function part is also referred to as node control device.

The router 2A has a function to read the header part from the packet signal which was input, and determines the output destination according to the destination described in this header part. The destination here is not only another node device or a terminal or network system connected to the concerned node device (hereafter this may be referred to as "present node device"), but may be the present node device itself. The router 2A also has a function to notify the information on the transferred packet to the node control function part 2B.

The node control function part 2B is a function part equivalent to the node control device, and constitutes a major part of the node device in accordance with the present embodiment. The node control function part 2B, which comprises an optical path setting request function part 2B1, an optical path setting function part 2B2, a connection information response function part 2B3, and other necessary function parts, collates the network information obtained by the above mentioned connection information response function part 2B3 and information of the arriving packet (or information of a packet which is currently flowing) and sends a switching instruction of an optical path to an optical cross-connect 2C in the present node device and in other node devices when it is determined as necessary. Optical cross-connect (OXC) has the following functions.

(a) Relays optical signals sent from one or more other node devices connected to OXC, and outputs the optical signals to another arbitrary node device connected to the OXC.

(b) Drops an arbitrary optical signal out of optical signals sent from one or more other node devices connected to OXC, and transfers the optical signals to a router of a node device where the OXC is included.

(c) Adds an optical signal, which was sent from a router of a node device including OXC to the OXC, to an optical fiber network, and outputs the optical signal to another node device connected to the OXC.

A connection of optical signals, set or allocated between two node devices which are not necessarily adjacent to each other, is referred to as an optical path.

Figure 14:
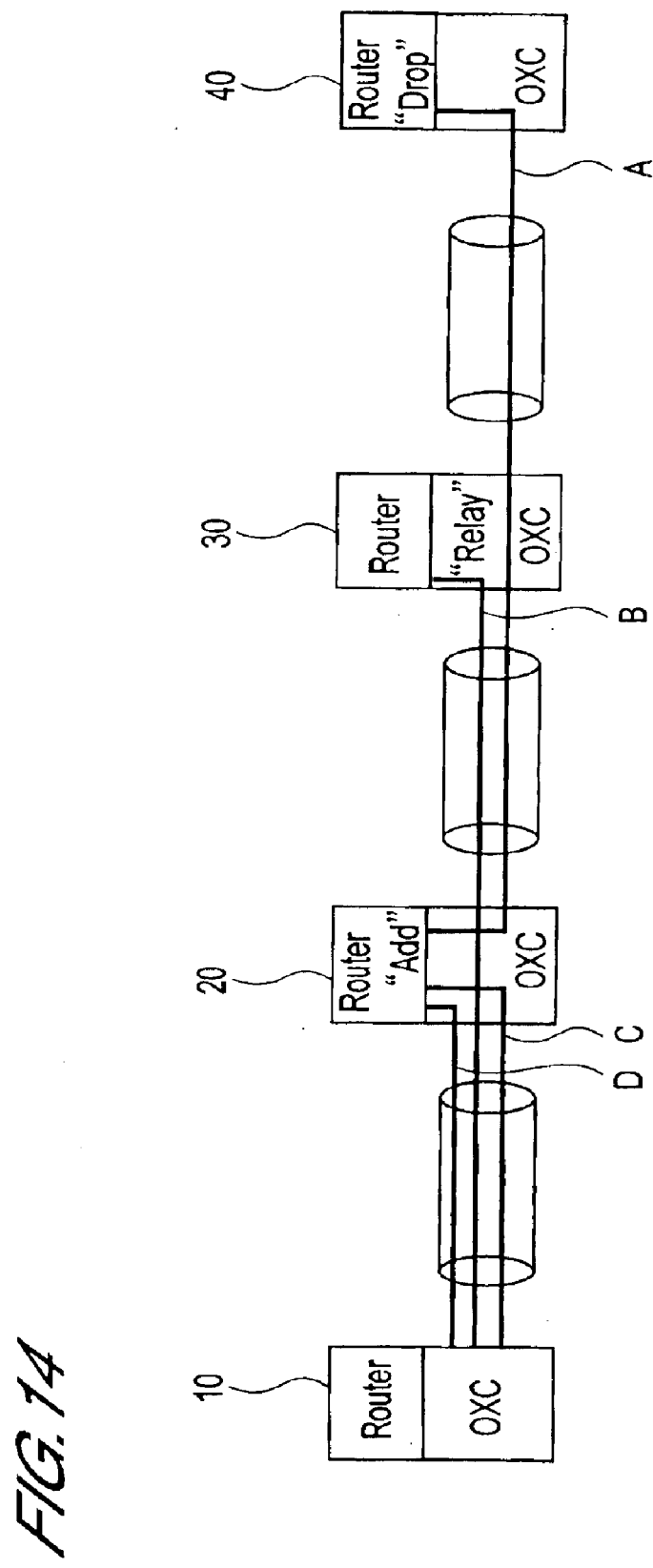
FIG. 14 is a drawing depicting the optical path.

FIG. 14 is a drawing depicting the optical path. It is assumed that four node devices 10, 20, 30 and 40, which comprise a router and an optical cross-connect respectively, are sequentially connected with optical fibers. If the optical paths A, B, C and D are set as shown in FIG. 14, the optical path A is set between the node devices 20 and 40, is added at the node device 20, relayed at the node device 30, and is dropped at the node device 40.

In other words, OXC sets an optical path by the above functions (a), (b) and (c). In this case, which output optical fiber the optical signal is relayed to or is dropped from, or which optical fiber the input optical signal is added to, is determined by the optical switching function inside the OXC. Details on each function part are described below.

(B-2) Configuration of Node Control Functional Part 2B

The node control function part 2B in accordance with this embodiment comprises the following three function parts.

(a) Optical path setting request function part 2B1

(b) Optical path setting function part 2B2

(c) Connection information response function part 2B3

(B-2-1) Optical Path Setting Request Function Part 2B1/Optical Path Setting Function Part 2B2

As mentioned above, the node control function part 2B has a function to collate the network information obtained by the connection information response function part 2B3 and information of the arrived packet (or information of a packet which is currently flowing), and instructs to switch the optical path allocation by the optical cross-connect of present node device and another cross-connect part 2C only when determined as necessary of the cut-through setting based on self judgement of the node control function part.

The above mentioned "information of the arrived packet and information of a packet" does not mean information of the data part of the packet, but information of the packet flow. In other words, the quantity of arrived packet and packets which are relayed and transferred, and the required transfer quality (bandwidth, delay time, allowable packet loss ratio), are shown.

Switching of an optical path will now be described with reference to FIG. 15(A) and FIG. 15(B). Just like the case in FIG. 14, four node devices 10, 20, 30 and 40, which comprise a router and optical cross-connect respectively, are sequentially connected via optical fibers.

Figure 15A:
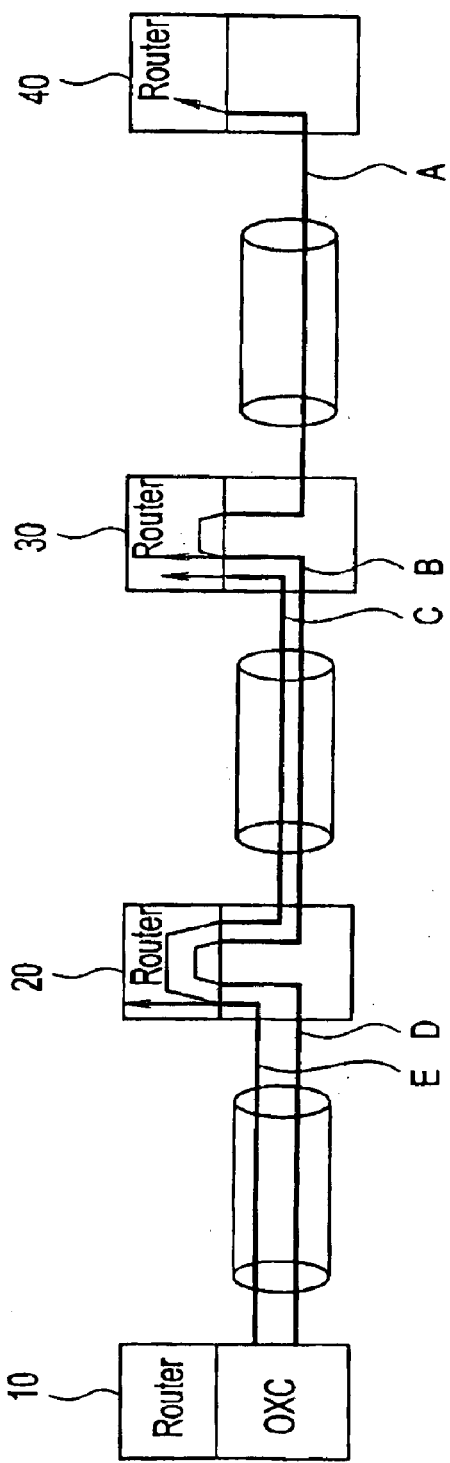
FIG. 15 (including FIGS. 15(A) and 15(B)) is a drawing depicting the optical path setting state.

In the optical path setting state shown in FIG. 15(A), all the optical paths B, C, D and E are dropped and added in the node device 20. Now it is assumed that when packets are sent from the node device 10 to the node device 20 via the optical path E, a part of the packets are forwarded to a terminal connected to the node device 20, and the remaining majority of the packets are forwarded to the node device 30 via the optical path C. And, it is assumed that all the packets sent from the node device 10 to the node device 20 via the optical path D are forwarded to the optical path B of the node device 30. In other words, it is assumed that most of the packets are relayed and transferred in this example.

This means that the router of the node device 20 is executing load processing of packets to be relayed and transferred, not the packets for the terminal connected to the self node device 20. When the router is in such a state, the node control function part sets another new optical path, as shown in FIG. 15(B).

Figure 15B:
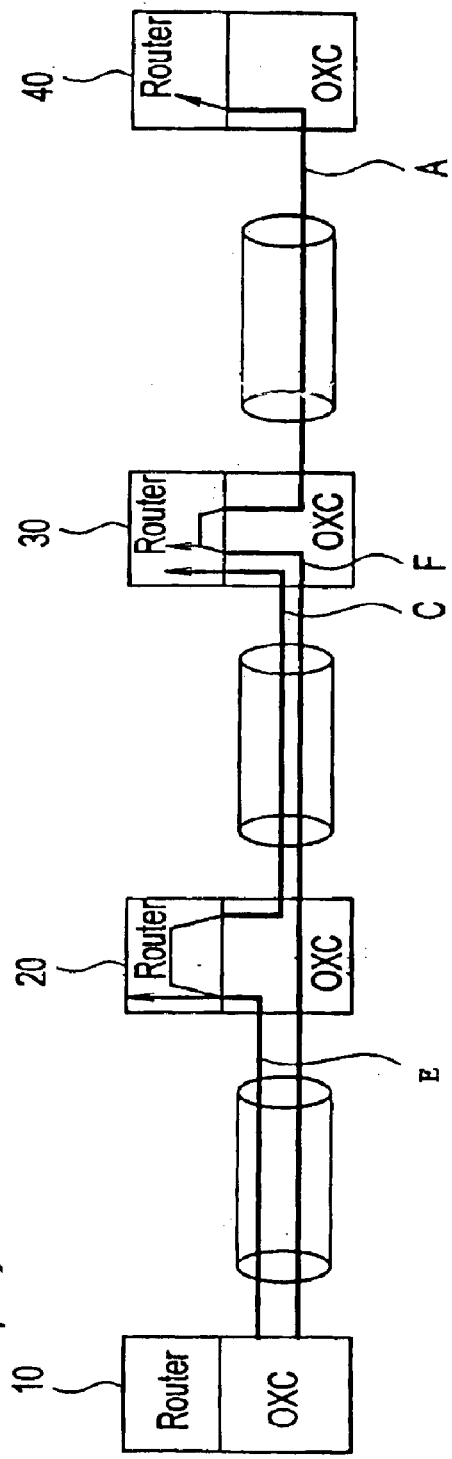

In other words, optical paths D and B, shown in FIG. 15(A), are set as a new optical path F in FIG. 15(B). This optical path F omits IP layer processing in the node device 20, that is, the packets are relayed and output only through the layer of the optical path.

If a new optical path is set in this way, the node device 10 can merely add packets to this cut-through path F when packets are sent from this node device 10 to a router of a node device beyond the node device 30. And, only when the packet capacity of the optical path F is insufficient, packets can be added to the optical path E of the node device 20, that is, the optical path dropped in the node device 20. As this example shows, if the optical path F, which omits the IP layer processing in the node device 20, is set between the node devices 10 and 30 and the packet is added to this optical path F, then processing which the router of the node device 20 executes for relaying the packet to another node device, that is load, can be decreased.

Poor throughput of an optical network is caused by the insufficient router performance of the node device, so the capacity of an optical network can be increased by setting the above mentioned cut-through path.

This means that the advantage or disadvantage of changing the setting of an optical path is comprehensively judged by (1) the transmission origination, transmission destination of the arrived packet, quantity of packets depending on the necessary QoS (Quality of Service), and
(2) the physical optical fiber connection and optical path setting status. For example, it is judged whether a change of the optical path is beneficial in terms of decreasing the router load for example, then the setting of the optical path is changed if the benefit is high.

To implement this function, disposed are the optical path setting request function part 2B1 and the optical path setting function part 2B2. Of these, the optical path setting request function part 2B1 instructs to switch the direction of optical paths, and the optical path setting function part 2B2 executes actual switching of directions based on the switching instructions.

(B-2-2) Connection Information Response Function Part 2B3

The connection information response function part 2B3 inquires of a node device adjacent to a node device (hereinafter present node device), which the node control device controls, about connection information on the present node device and connection information on the node device adjacent to the present node device each time a predetermined time elapses or a predetermined event is generated, and responds with the connection information on the present node device and the connection information on the node device adjacent to the present node device when the inquiry is received from the node device adjacent to the present node device.

The connection information response function part 2B3 implements a function/to inquire which router is connected to a logically adjacent router 2A, and which function the optical cross-connect device part (or optical ADM device) 2C connected to the present node device has, and how the optical path 3 is connected at each predetermined time elapses or at each time an event occurs, and responds when an inquiry is received.

The inquiry and response here may be implemented as a function of the router 2A using a packet signal or by another line.

Figure 3:
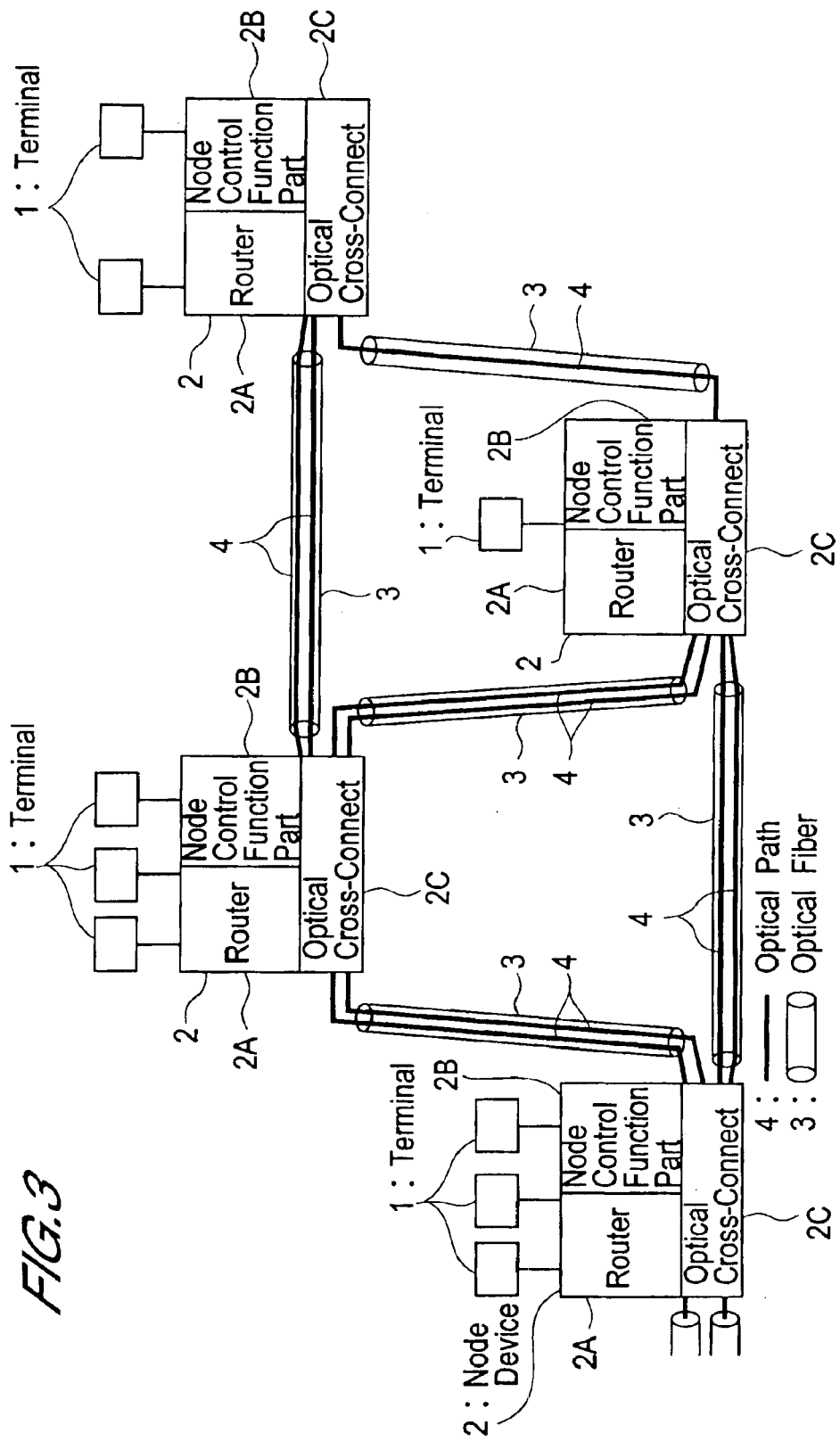
FIG. 3 is a drawing depicting an embodiment of the optical network system in accordance with the present invention.

In the optical network system as shown in FIG. 3, plural node devices, for example, a present node device (a first node device), a second node device adjacent to the first node device, a third node device adjacent to the second node device, and etc., are provided therein.

In such system, a router 2A in the second node device adjacent to the present node device must have been written information of a router 2A in the third node device adjacent to the second node device adjacent to the present node so the node control function part 2B can obtain information on the entire network by repeatedly executing the first function. Such an inquiry can also be executed for node device other than the adjacent node device 2.

The information on the adjacent node device (router 2A+optical cross-connect 2C) determined by this function, information on the node device 2 adjacent to that adjacent node device and communication status between the node device are sent to the router 2A.

(B-3) Optical Path Setting Operation

Next the optical path setting operation by the node device having the above mentioned functional configuration will be described. FIG. 4 and FIG. 5 show a process where an optical path for cut through is set in the optical network. In FIG. 4 and FIG. 5, it is assumed that the first and fourth node devices 21, 22, 23, 24 in FIG. 4 and FIG. 5 are disposed in the optical network, and one terminal (shown as terminals 1–4 in FIG. 4 and FIG. 5) is connected to each of the node devices.

In the first state (FIG. 4(A)), each node device 2 (21, 22, 23, 24) is connected to an adjacent node device via an optical fiber 3, but the respective function, performance and optical path status is unknown to each other. In this state, each node device 2 executes processing by the above mentioned connection information response function part 2B3, and starts collecting information on the adjacent node device to which it is directly coupled by an optical fiber 3 (FIG. 4(B)). In other words, each node device transmits information on the present node device to the adjacent node device. By this, the node device 21, for example, obtains information on the adjacent node device 22 and the adjacent node device 23. In the same way, the node device 22 obtains information on the adjacent node device 21 and adjacent node device 24.

When such a transfer of information ends, each node device 2 transmits information to non-adjacent node devices to which it is indirectly coupled through another node device (FIG. 4(C)). Since each node device 21, 22, 23, 24 has information which is transferred from the adjacent node device in the above transfer, one node device receives information on its adjacent node device and also the device adjacent to that adjacent node device. In the case of the node device 21, for example, the information on the node device 24 which the node device 22 has can be obtained. By executing this process periodically, each node device 2 (21, 22, 23, 24) can obtain information on the entire optical network.

Let us assume that a user packet, from a terminal to another terminal constituting the optical network, flows into the optical network in such a state. Here, it is also assumed that the user packet from the terminal 1 to the terminal 4 flows into the node device 21. At this time, the router 2A of the node device 21 analyzes the addresses of the user packet, recognizes that the start point node device is the node device 21 itself and the end point node device is the node device 24. Also the router 2A of the node device 21 recognizes that there are a lot of optical path resources available between the node devices 21 and 22, and between the node devices 23 and 24 based on the information which has been obtained.

As a result of this analysis, the node device 2 (21, 22, 23, 24) determines the route of an optical path by the optical path setting request function part 2B1 such that the number of hops in the router 2A on the transmission route is minimized, that is, the optical path is allocated to cut through the router 2A. Then the present node device instructs (requests) the node device on the relay route to actually set this optical path.

Figure 5A:
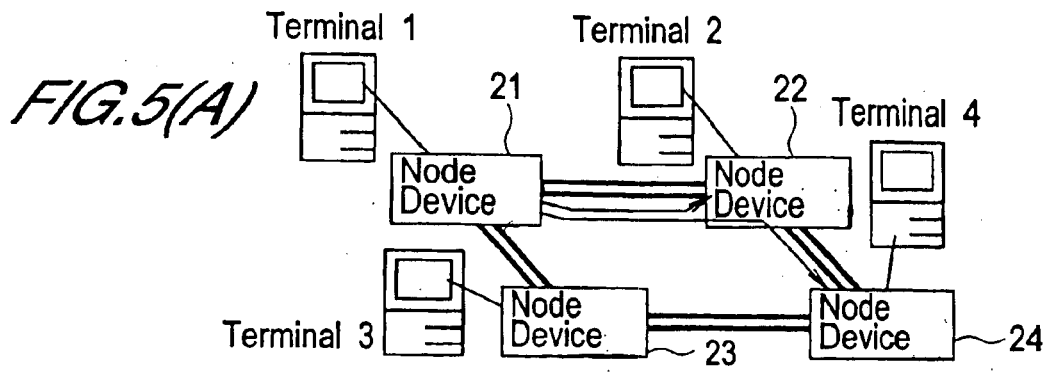
FIG. 5 (including FIGS. 5(A)–5(C)) is a diagram for explaining another example of setting of a cut-through optical path in accordance with the present invention.

In the case of FIG. 5(A), for example, the node device 21 requests the node device 22 and 24 to set an optical path which cuts through the node device 22 between the node devices 21 and 24.

The cut-through optical path does not have to be allocated to any packets which are forwarded from the start point node device to the end point node device only one hop. Because, even if only a little number of packet forwarding processings decrease at the router 2A, the load to be applied to the router 2A decreases, and throughput improves and delay time decreases.

Even if the number of cut throughs is not at the maximum, improving throughput in the entire optical network system or decreasing the delay time can be expected.

Figure 5B:
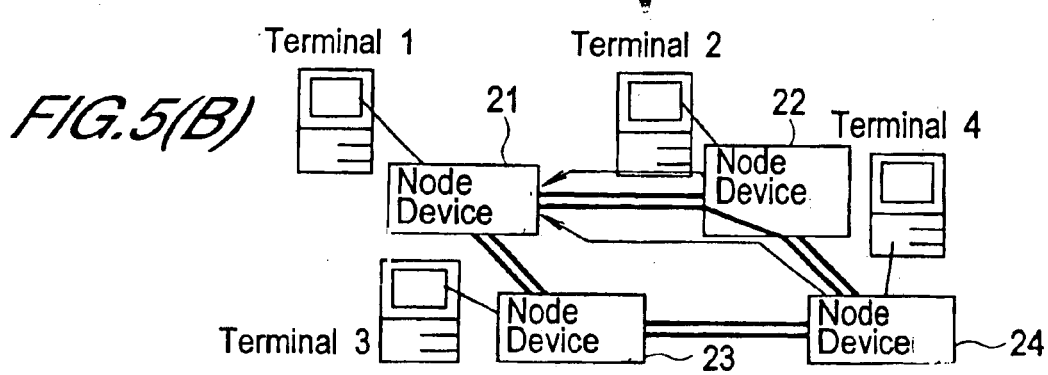
Figure 5C:
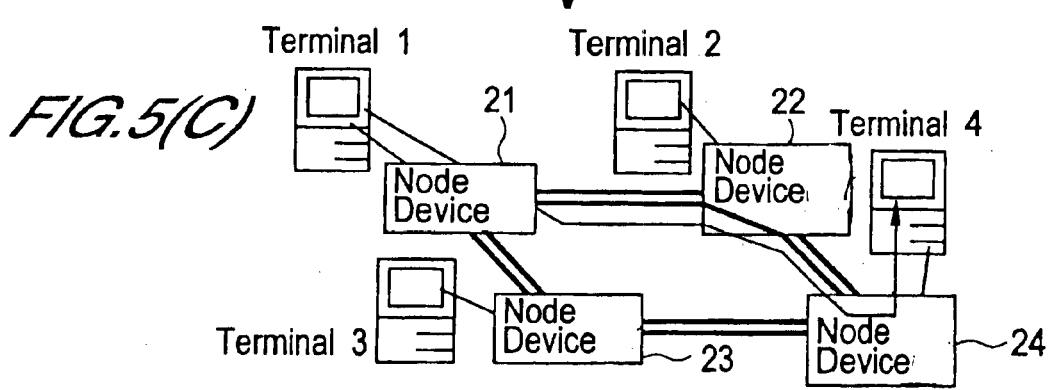

When the node device 22 and node device 24 receive this request, the node device 22 and the node device 24 set an actual cut-through optical path using the optical path setting function part 2B2, and notifies completion of the setting to the node device 21 when the setting is completed (FIG. 5(B)). In FIG. 5(B), the route of this notice is shown by the directional arrow marks. By this notice, the node device related to the cut through updates the routing table which is used for routing of the user packet. After updating of the routing table, the packet is transferred via the route of the newly set optical path (FIG. 5(C)).

There are some handling methods of the user packet during cut-through optical path setting, for example, a method of allowing the user packet to standby in the node device until the new route of the cut-through optical path is set, or a method of transferring the user packet via a conventional route until the new cut-through optical path is set, then switching the route after setting the new cut-through optical path.

The router control part 2B2 can release the newly set cut-through optical path when a predetermined time has elapsed since the initial setting, or when an event occurs, such as a decrease in the number of user packets (from the threshold) at the node device positioned at both ends of the cut-through optical path. Release here may be a physical release or may be a logical release, where the setting status remains but the path is regarded as an available resource so that the setting is changed when a new optical path setting is requested.

The decrease in the number of communication packets at the node device positioned at both ends of the cut-through path is notified via a dedicated communication line (optical path or electric wire) disposed between the node devices or via several hops of other optical paths displaced between the node devices.

(B-4) Effect of the Embodiment

By disposing the node device (node control device, optical path setting method) having the functional configuration in accordance with the present embodiment, it becomes possible to omit the layer 2 and layer 3 processing. Therefore, the load to be applied to the router 2A can be decreased dramatically compared with a conventional system. So an improvement of throughput and a decrease of delay time can be implemented in a packet transfer. As a consequence, if this optical network system is used for Internet service, for example, the user will experience such benefits as quicker response times.

(C) Second Embodiment

Figure 6:
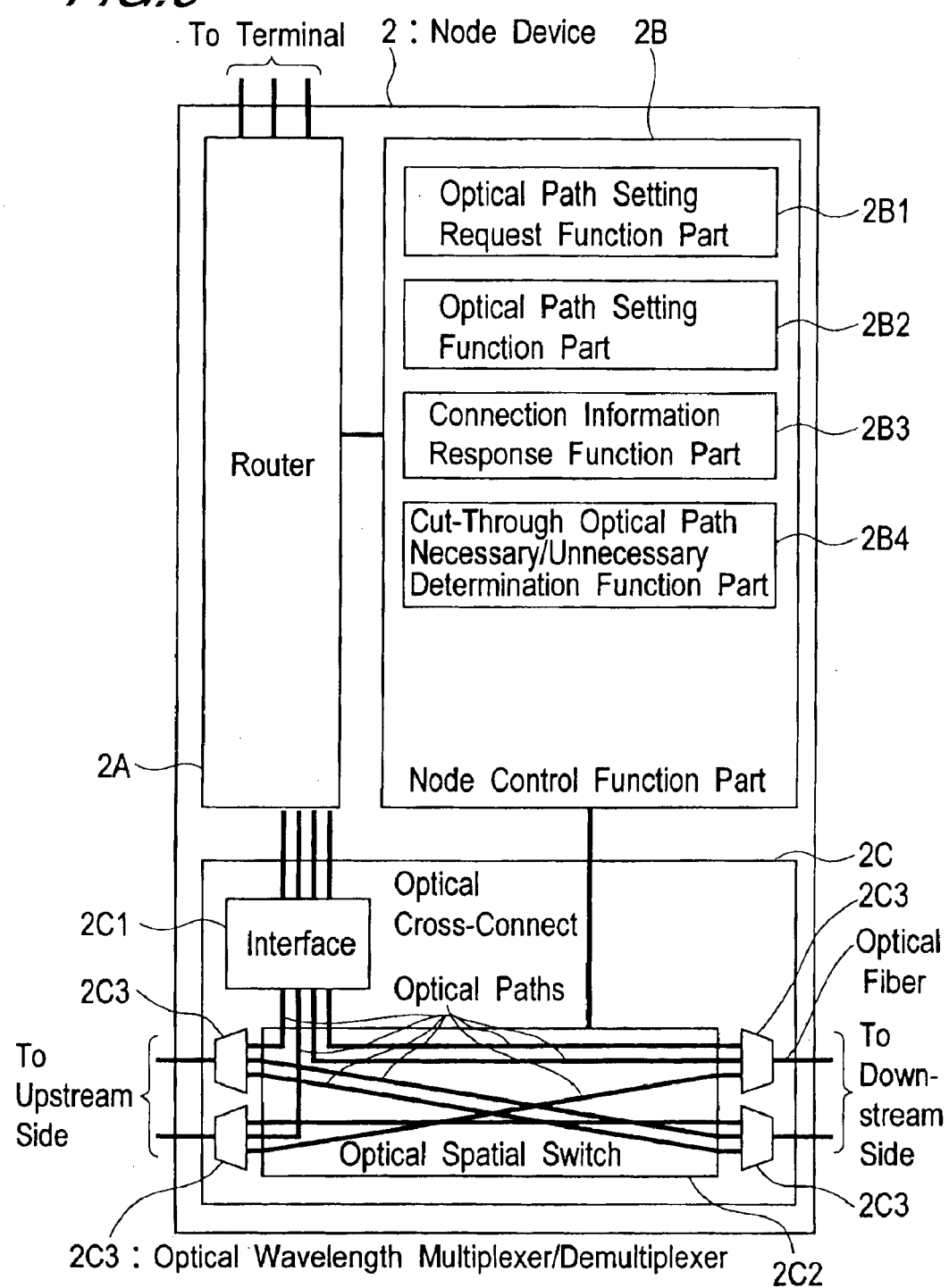
FIG. 6 is a drawing depicting a second embodiment of the node device in accordance with the present invention.

Next the second embodiment will be described with reference to FIG. 6. This second embodiment is characterized in that the following function part is added to the node control function part 2B to be mounted on the node device 2 in each above mentioned embodiment, and is equivalent to a variant form of the above mentioned embodiments.

Here, the new functional part to be added is called the cut-through optical path necessary/unnecessary determination function part 2B4. This cut-through optical path necessary/unnecessary determination function part 2B4 determines the necessity of setting the cut-through optical path before the setting operation described in the respective above mentioned embodiments actually start, and selectively sets the cut-through optical path only when it is determined as necessary.

Specifically, the cut-through optical path necessary/unnecessary determination function part 2B4 judges the necessity of the cut-through optical path before the edge node device transmits the cut-through request packet or, based on the following criteria, the cut-through setting packet.

The criteria used here is whether a large volume of packets having the same transmission source address (SA) and the same destination address (DA) will be transferred on the optical network system in the future or not. This possibility is determined not only by determining whether it is possible that a large volume of packets will flow on the same route, but also whether the packets are application packets for which the requirement for delay times is strict (real-time packets).

Only when it is determined that setting of a new cut-through optical path is necessary, the cut-through setting packet described in the respective above mentioned embodiments is allowed to be transmitted.

Determining whether a new cut-through optical path is set based on the cut-through optical path necessary/unnecessary determination function part 2B4 need not be executed by the edge node device.

In this way, if the node device (node control device, optical path setting method) having a functional configuration in accordance with the second embodiment is disposed on the optical network system, the cut-through optical path is set only when a new path is necessary. For another case, the cut-through optical path is set only when a highly required service for the entire network or for a certain user is provided, therefore a system which exhibits minimal waste of wavelength resources can be constructed under current optical communication technology, where the number of wavelengths is limited to several ten to several hundred.

(D) Third Embodiment

Generally speaking, the first and second embodiments described above are methods combining the basic concept, which is the dynamic allocation of optical paths, and a flow-driven type multi-layer switch in IP/ATM (Asynchronous Transfer Mode) router represented by MPLS (Multi-Protocol-Label-Switching) However, the environment assumed in IP/ATM and the resource environment assumed in IP/Lightwave, which is described in the present specification, are not always the same.

For example, in the case of IP/ATM, many channels can exist since ATM can set a lot of channels logically on a physical network, therefore the band of each path can be narrow.

In the case of IP/Lightwave, on the other hand, the number of optical paths is limited to the number of optical wavelengths multiplexed (or optical code in OCDM network). Here the current optical transmission signal speed is 2.5 [Gbit/sec]–40 [Gbit/sec], and compared to this speed, the speed of the router 2A is often slower. The speed of the interface may be as high as 2.5 [Gbit/sec], but this speed is often impossible for actual throughput or very expensive. Also, even if the speed of the router 2A reaches ultra-high-speed, the speed of the access system or application speed is not always that fast.

Figure 7:
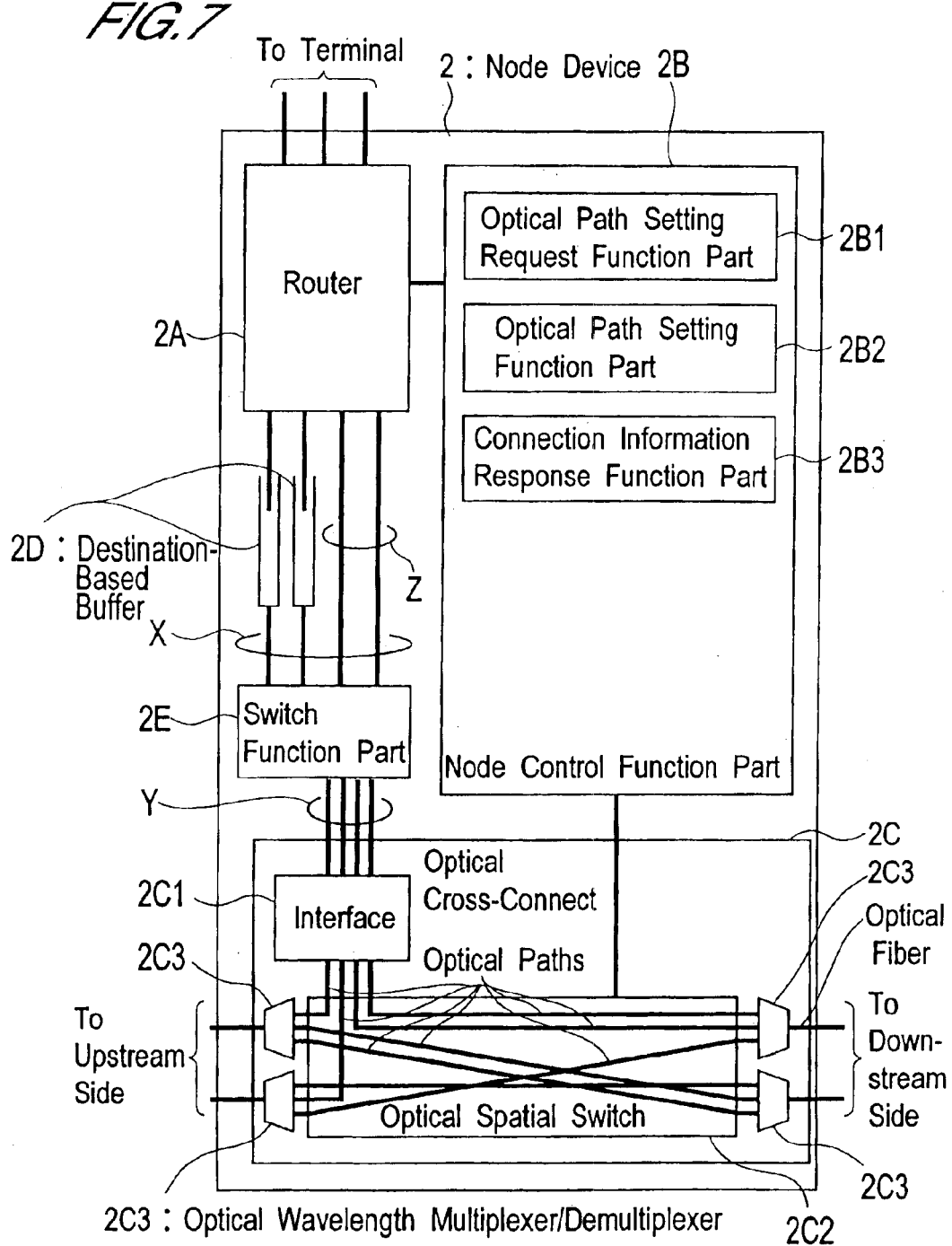
FIG. 7 is a functional block diagram depicting a third embodiment of the node device in accordance with the present invention.

An object of the present embodiment is implementing a node device (node control device, optical path setting method) which can use the bandwidth of the optical path as effectively as possible, and implementing an optical network system where bandwidth use of the optical path is efficient. FIG. 7 shows a configuration example of a node device in accordance with the present embodiment. For the node control function part 2B, one of the node control function part 2B, described in the first to fourth embodiments, is applied.

The configuration unique to the present embodiment is characterized by that the destination-based buffer 2D is disposed at some outputs of the router 2A constituting the node device 2. In other words, data output of the router 2A is input to the optical cross-connect (optical ADM) 2C via the destination-based buffer 2D.

The destination-based buffer 2D has a switch function part 2E which allows guiding the signal read from each buffer to an arbitrary input port of the optical cross-connect 2C. This switch function part 2E can be implemented in various way, such as a function of the optical cross-connect 2C side.

Next the IP packet transfer operation, which is implemented by the node device 2 in accordance with the present embodiment, will be described. When an IP packet is sent from a terminal (or access net) to a specific destination, the node device 2 in the present embodiment once stores the IP packet in the destination-based buffer 2D. When a number of IP packets have been stored in the destination-based buffer 2D, cut-through optical path setting processing is executed by the node control function part 2B.

When the total number of data lines between the router 2A and the switch function part 2E is x, the total number of data lines in the switch function part 2E and the interface part 2C1 is y, and the number of data lines which have no destination-based buffer among the data lines between the router 2A and the switch function part 2E is z in FIG. 7, y=z is preferable, even although x, y and z are arbitrary numbers.

When the cut-through optical path is set, the IP packets, which have been stored in the destination-based buffer 2D thus far, are all transmitted to the destination side node device. After this transmission ends, this cut-through optical path is released. After releasing, this optical path is used for the transmission of IP packets stored in another destination-based buffer 2D. A description on the cut-through optical path setting operation is omitted here, since it is the same as the operation described in the respective above mentioned first to fourth embodiments.

The destinations of the IP packets stored in the destination-based buffer 2D need not be exactly the same. Even if the final destination is different, a packet can be effectively stored in the same destination-based buffer 2D if the packet passes through the same route.

If the node device (node control device, optical path setting method) having the functional configuration in accordance with the fifth embodiment is disposed in the optical network system, a decrease of load to be applied to the router 2A and an improvement of throughput can be implemented by setting the cut-through optical path, and also a limited band of optical signals can be more effectively used.

In particular, because the currently available commercial optical switches have relatively slow switching speeds, there is a demand to minimize the overhead required for switching time, that is, a demand to setting the optical path for a period of time while outputting accumulated a number of IP packets without frequently switching the optical path. This method effectively satisfies such demand.

(E) Fourth Embodiment

Figure 8:
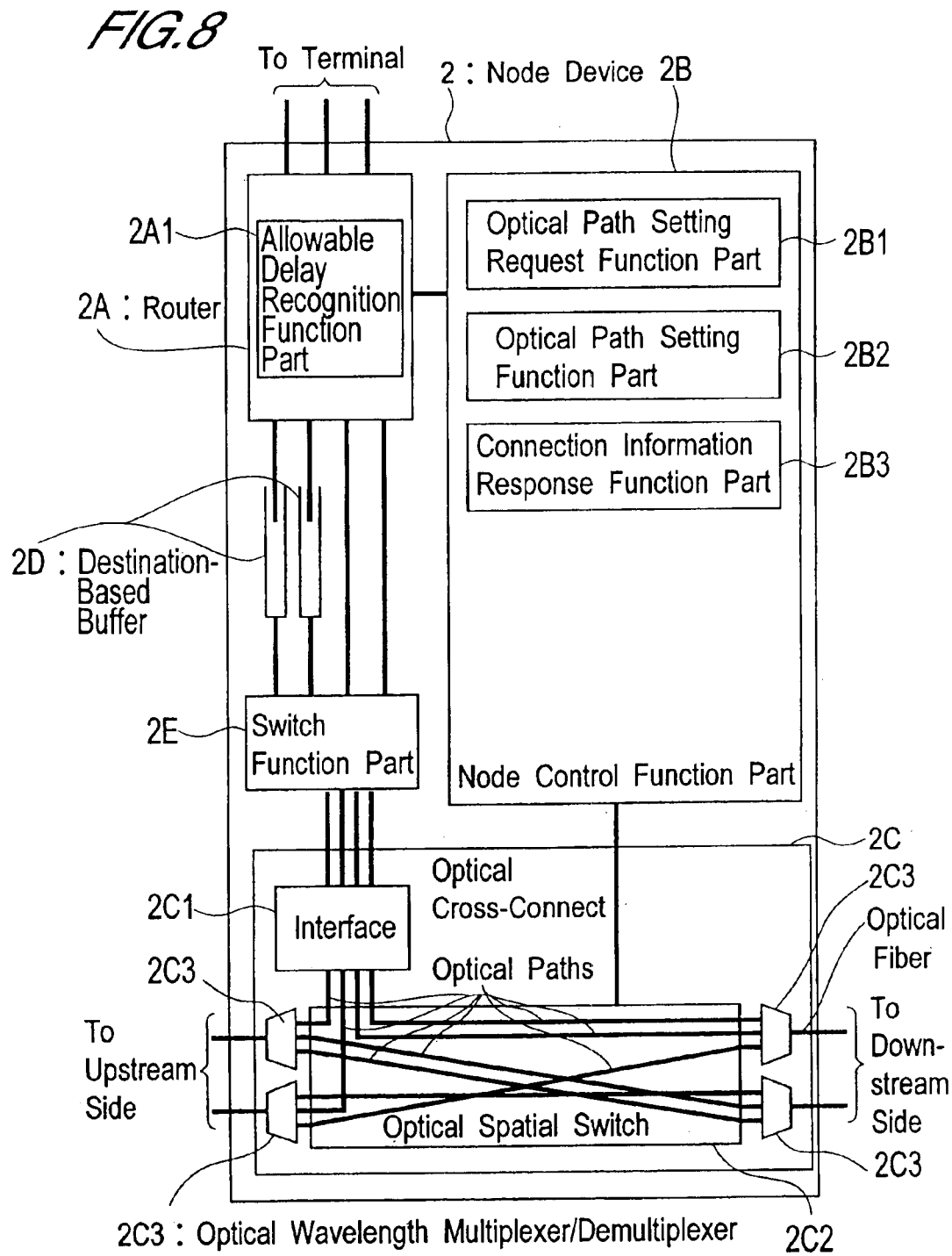
FIG. 8 is a functional block diagram depicting a fourth embodiment of the node device in accordance with the present invention.

Next the fourth embodiment will be described with reference to FIG. 8. The fourth embodiment corresponds to a modification form of the above mentioned third embodiment. The difference between the fourth embodiment and the third embodiment is that in the case of the sixth embodiment, an allowable delay recognition function part 2A1 is newly disposed in the router 2A constituting the node device 2. The allowable delay recognition function part 2A1 functions primarily at the transmission side edge node device.

This function part is provided for the purpose of adaptively preventing the occurrence of problems which may occur when the third embodiment is used alone. In other words, in the case of the third embodiment, an improvement of throughput and effective use of bandwidth are possible, but the delay time may become a problem. For example, in the case of packets of real-time system applications, such as an Internet TV telephone, service quality may drop if packets are stored for a predetermined time or longer.

In the node device in accordance with the present embodiment, the allowable delay recognition function part 2A1 of the router 2A first determines whether the current transfer target packet is a packet of a real-time system application such as an Internet TV telephone, or a packet of a non-real-time system application such as a file transfer. As a result of this determination, a packet transfer using the destination-based buffer 2D is selected only for the packet determined as the latter.

There is another operation method. In this operation method, the destination-based-buffer is classified not only by destination but also by the quality class. A packet for real-time processing is classified into packets for real-time processing and is transferred by connecting the cut-through optical path to the destination in a short interval.

A packet for which a long delay time is acceptable is stored in a buffer for such packets, and the optical path is connected when a sufficient number of packets are stored in this buffer, so that these packets are output all at once to destinations via this optical path.

By using such an operation method, the optical network system and the node devices constituting the optical network system can handle packets which have strict delay time conditions, while effectively utilizing the bandwidth of the optical path.

In this way, if the node device (node control device, optical path setting method) having the functional configuration in accordance with the fourth embodiment is disposed in the optical network system, packets of a real-time system application can be transferred without being delayed in a queue in the destination-based buffer, and has the features of the third embodiment as well.

(F) Fifth Embodiment

Generally speaking, and as mentioned in the above, the first and second embodiments are methods combining the basic concept, which is the dynamic allocation of optical paths and flow driven type multi-layer switch in an IP/ATM router such as MPLS, as mentioned above. However, the resource environment assumed in IP/ATM and the resource environment assumed in IP/Lightwave, which is described in the present description, are not always the same.

For example, in the case of IP/ATM, communication with an adjacent node device is insured, since ATM can set channels logically on a physical network.

In the case of IP/Lightwave, on the other hand, the method used for ATM cannot be used for a logical channel for an information transfer, since the number of optical paths is the same as the number of optical wavelengths multiplexed or the number of code for OCDM. Therefore, if a node device of an optical network system is set so as to use all optical paths to which an adjacent node device inputs to for cut through, then communication, such as release of an optical path setting, cannot directly be executed between the node devices and the adjacent node device.

In the node device in accordance with the present embodiment, it is proposed to dispose a function part for executing control to always keep free an optical path to be used as an information channel between the present node device and another node device. This function part is called an information channel insuring confirmation function part 2B5.

Figure 9:
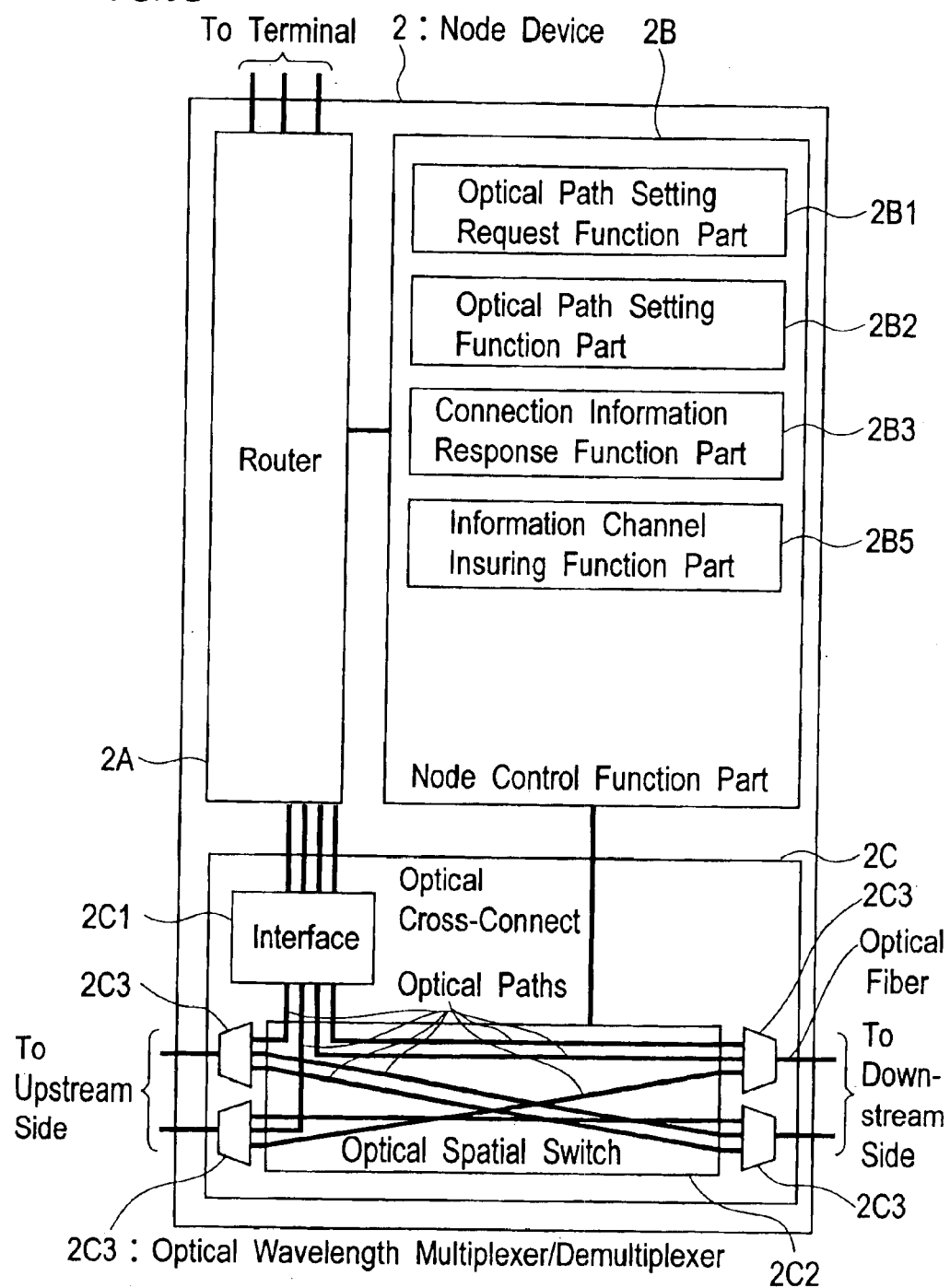
FIG. 9 is a functional block diagram depicting a fifth embodiment of the node device in accordance with the present invention.

FIG. 9 shows a configuration example of the node device in accordance with the present embodiment. An information signal processing function part for exchanging information signals with another node device is disposed in the node control function part 2B, although the information signal processing function part is not illustrated in FIG. 9 (or in other drawing). Disposition of the information signal processing function part is the same for the above mentioned and later mentioned embodiments.

Although FIG. 9 shows a configuration where the information channel insuring confirmation function part 2B5 is added to the node device in accordance with the above mentioned first embodiment, it is certainly possible to apply the information channel insuring confirmation function part 2B5 in accordance with the present embodiment to each node device in accordance with the second to fourth embodiment.

Next the setting of a cut-through optical path by the node device having such a configuration will be described. When the node device 2 receives a request to omit the layer 2 and layer 3 processing by the optical layer (layer 1), the node device 2 confirms the existence and appropriateness of the wavelength resource of the present node device by function part of the node control function part 2B, and determines whether cut through is possible.

When the setting of the cut-through optical path is possible and the optical path is actually set, the node device 2 determines whether an information channel required for communication between the present node device and another node device is free by the information channel insuring confirmation function part 2B5. If it is confirmed that a required information channel is kept, the node device 2 actually executes switching to the optical path.

A general data packet can also be transferred to the optical path for an information channel insured in this manner. It is easiest to set this information channel between the present node device and an adjacent node device, but this approach is not an absolute. Even if some packet transfers are necessary (using a longer route), required information (packet) can reach its destination via the insured information channel.

As mentioned above, if the node device (node control device, optical path setting method) in accordance with the present embodiment is disposed in the optical network system, an information channel can always be insured between adjacent nodes, in addition to the effects of the respective above mentioned embodiments. Therefore such communication as releasing the setting of an optical path can always be directly executed.

(G) Sixth Embodiment

Figure 10:
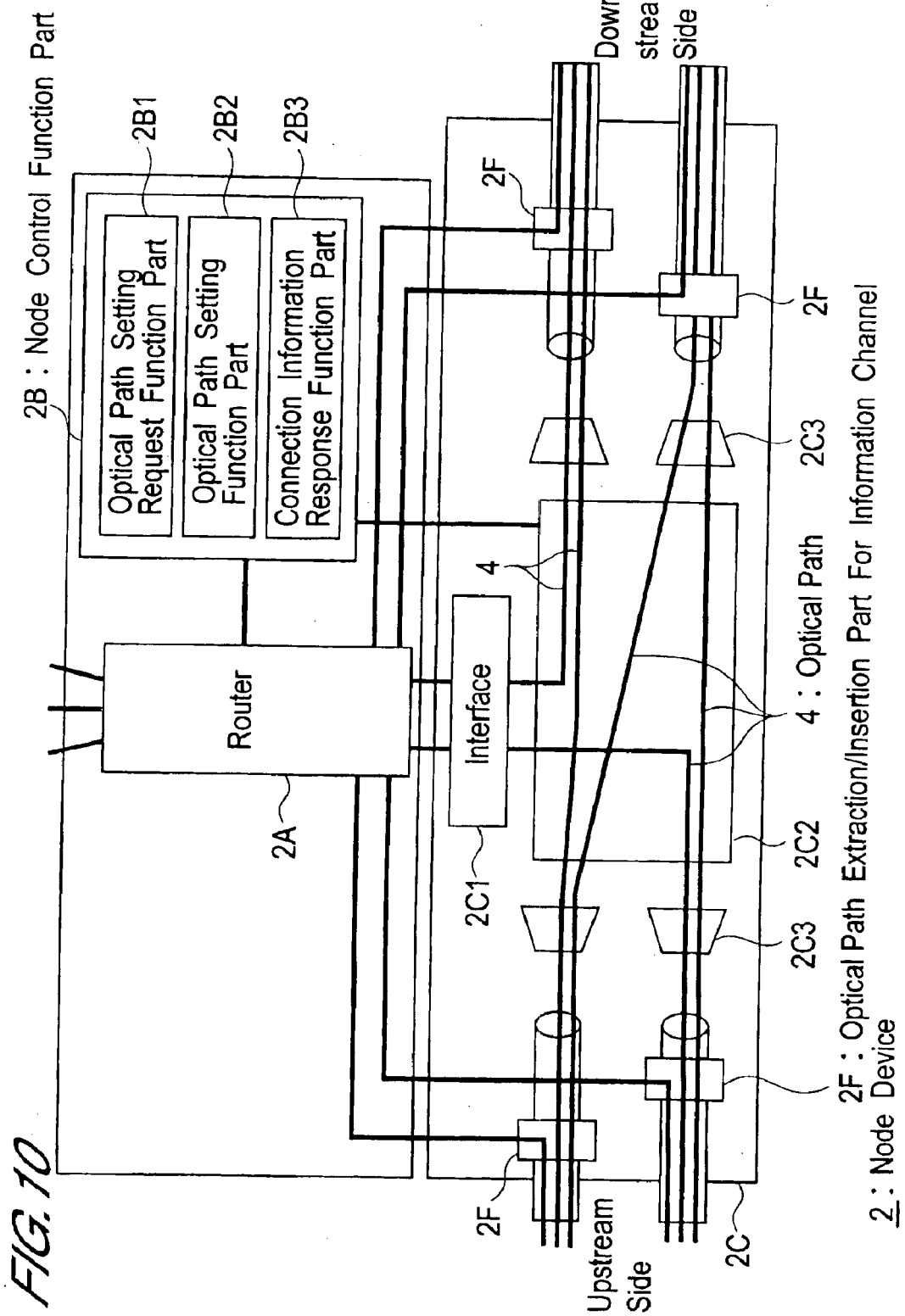
FIG. 10 is a functional block diagram depicting a sixth embodiment of the node device in accordance with the present invention.

Next the sixth embodiment will be described with reference to FIG. 10. The above mentioned fifth embodiment is a configuration example based on a technical concept only to insure an information channel. Whereas in the present embodiment, which is a node device which sets a dedicated optical path in advance for an information channel, that is, allocates a certain optical wavelength dedicated to an information channel, so as to insure releasing the setting of the cut-through optical path, will be described.

To implement such a function, in the case of the node device 2 in accordance with the present embodiment, an optical path extraction/insertion (drop/add) part for the information channel 2F to extract (drop) optical signals with a specified wavelength from the optical fiber 3 or insert (add) optical signals with a specified wavelength into the optical fiber 3, is disposed in the node device.

The optical path extraction/insertion (drop/add) part for the information channel 2F functions in some cases as a means for extracting (dropping) optical signals for the information channel, which were transferred from another node device, from the optical fiber 3, and functions as a means for inserting (adding) optical signals for the information channel to another node device.

In other words, the optical path extraction/insertion (drop/add) part for the information channel 2F extracts (drops) an optical signal with a specified wavelength from the optical fiber 3, transfers the optical signal to the router 2A and guides the optical signal to the information signal processing function part (in the node control function part 2B) which processes information conveyed on the optical signal. The optical path extraction/insertion (drop/add) part for the information channel 2F also receives the information which the information signal processing function part (in the node control function part 2B) addressed to another node device via the router 2A, and inserts (adds) the optical signal with a specified wavelength or optical code, where this information is conveyed, to the optical fiber 3.

The basic operations of the cut-through optical path setting procedures, and the user packet transfer procedure, are the same as the cases of the other embodiments.

In this way, if the node device (node control device, optical path setting method) in accordance with the present embodiment is disposed in the optical network system, an information channel required for the transfer of information for switching of an optical path can be absolutely and physically insured.

(H) Seventh Embodiment

Figure 11:
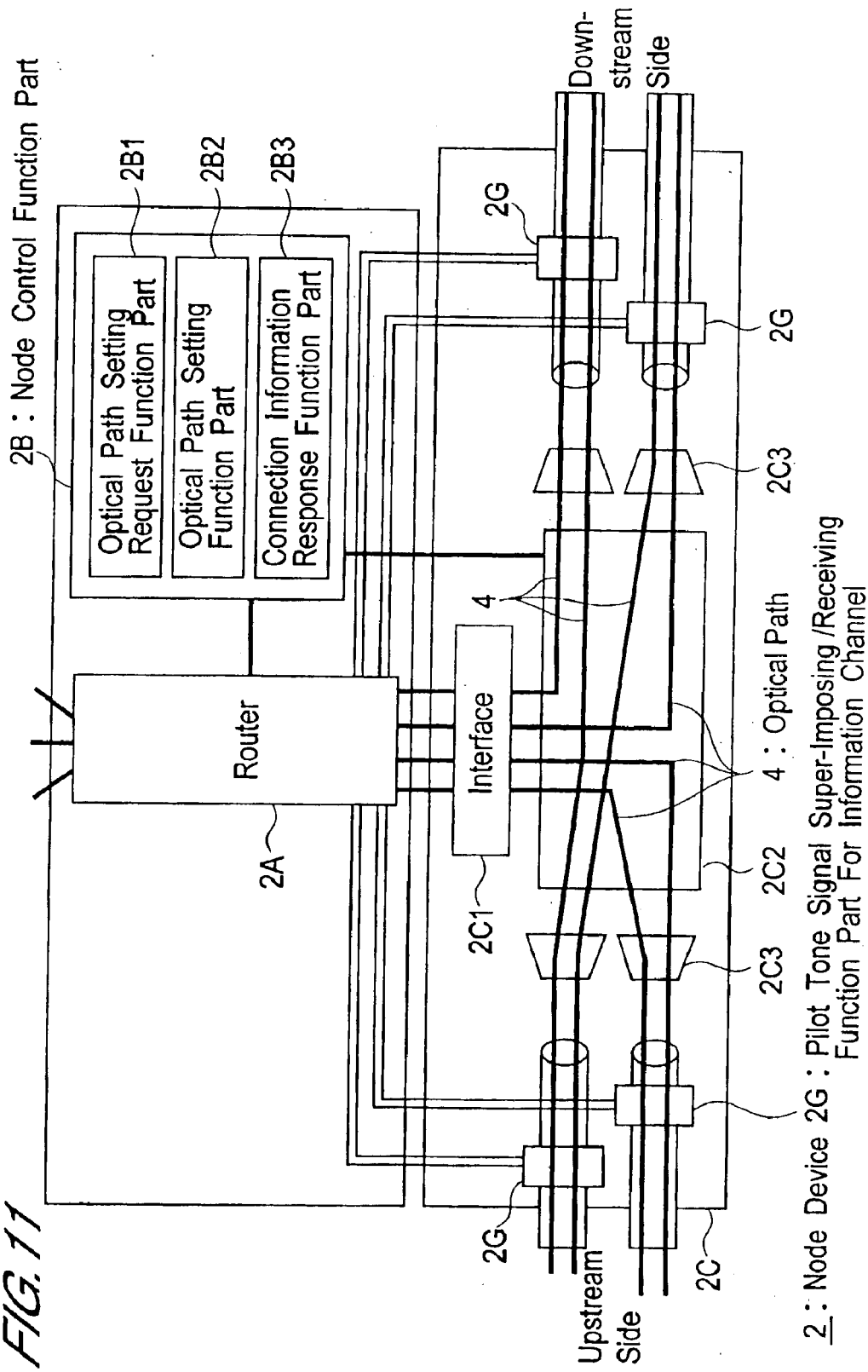
FIG. 11 is a functional block diagram depicting a seventh embodiment of the node device in accordance with the present invention.

Next the seventh embodiment will be described with reference to FIG. 11. Unlike the above mentioned sixth embodiment, in the seventh embodiment, a dedicated optical path for the information channel is not set in advance, instead a pilot tone signal is super-imposed (overlapped or overlaid) on the normal cut-through optical path for user data so as to insure the information channel at all times.

The node device 2 in accordance with the present embodiment implements this function by the pilot tone signal transmission function part 2G disposed in the node device. By this function, information can be exchanged between adjacent nodes (or nodes slightly distant from each other), even if all or almost all optical paths in a node device 2 are set to the cut-through optical paths.

A certain effect can be expected when the present method is applied as is, but if a plurality of node device on the same path transmit pilot tone signals at the same time, a collision of pilot tone signals may occur at the node device in downstream, and transmitted information may not be received.

Therefore in the present embodiment, it is more effective to add the following means. For example, the pilot tone signals are transmitted in bursts only when information is transmitted. In this case, even if transmitted information cannot be received due to a collision of pilot tone signals, the node device furthest downstream can request a resend using the idle time of the information channel to the upstream nodes. Another example is predetermining to always reply an acknowledgment (ACK) to the transmission side whenever information is received normally, so that information is automatically resent if the acknowledgment (ACK) is not returned.

In this case, the probability of an occurrence of collisions can be further decreased if the node device at the upstream side executes a resend at different timing by some means (e.g. determining a time until a resend by random numbers).

If the node device (node control device, optical path setting method) in accordance with the present embodiment is disposed in an optical network system, an information exchange between adjacent node device (including node device slightly distant from each other) becomes possible, even if all or almost optical paths pass through the node device without layer 2 or layer 3 processing.

(I) Eighth Embodiment

Figure 12:
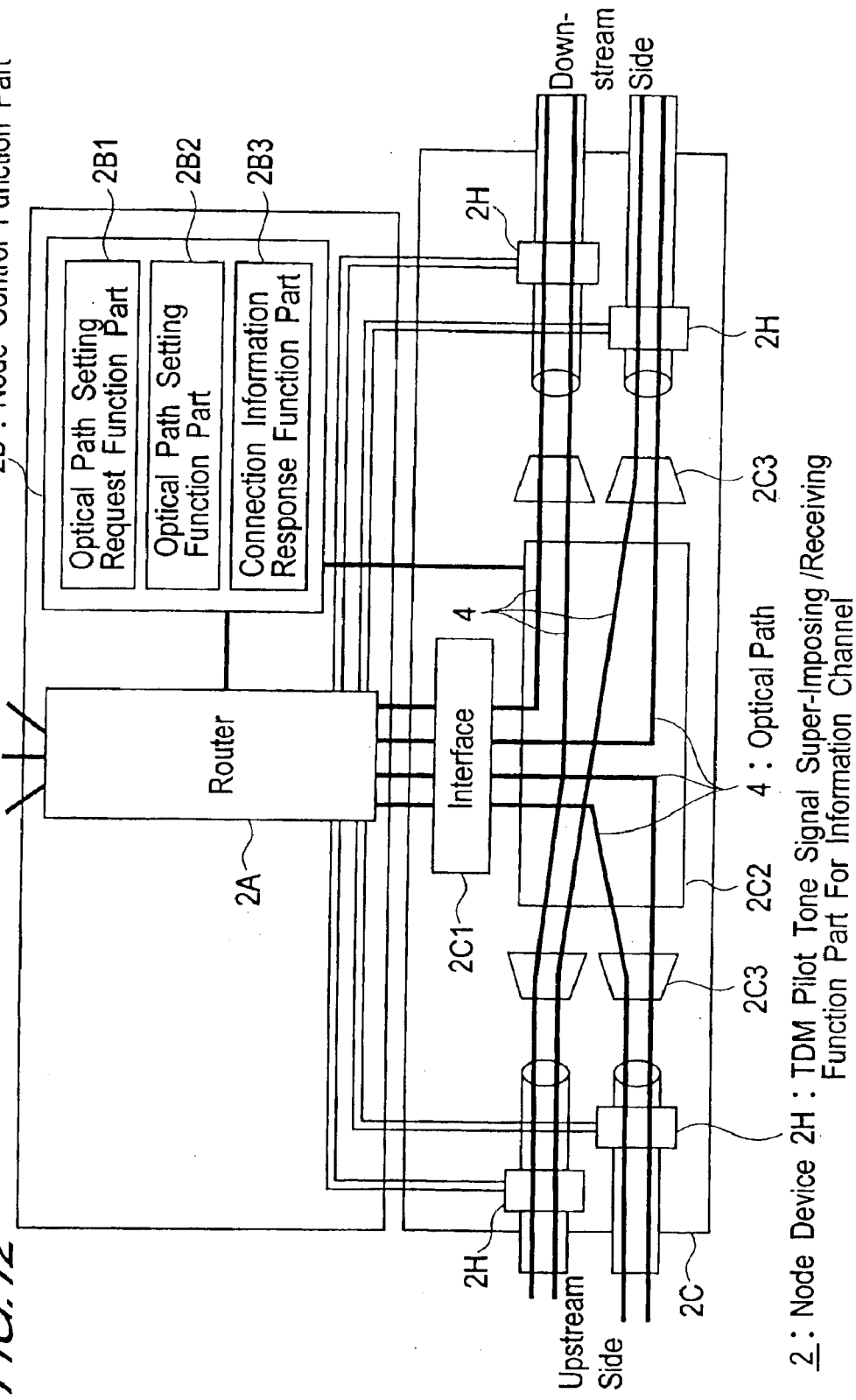
FIG. 12 is a functional block diagram depicting an eighth embodiment of the node device in accordance with the present invention.

Next the eighth embodiment will be described with reference to FIG. 12. Unlike the above mentioned seventh embodiment, in the present embodiment, an information channel is insured by time division multiplex (TDM) of pilot tone signals on a normal cut-through optical path for user data.

Figure 13:
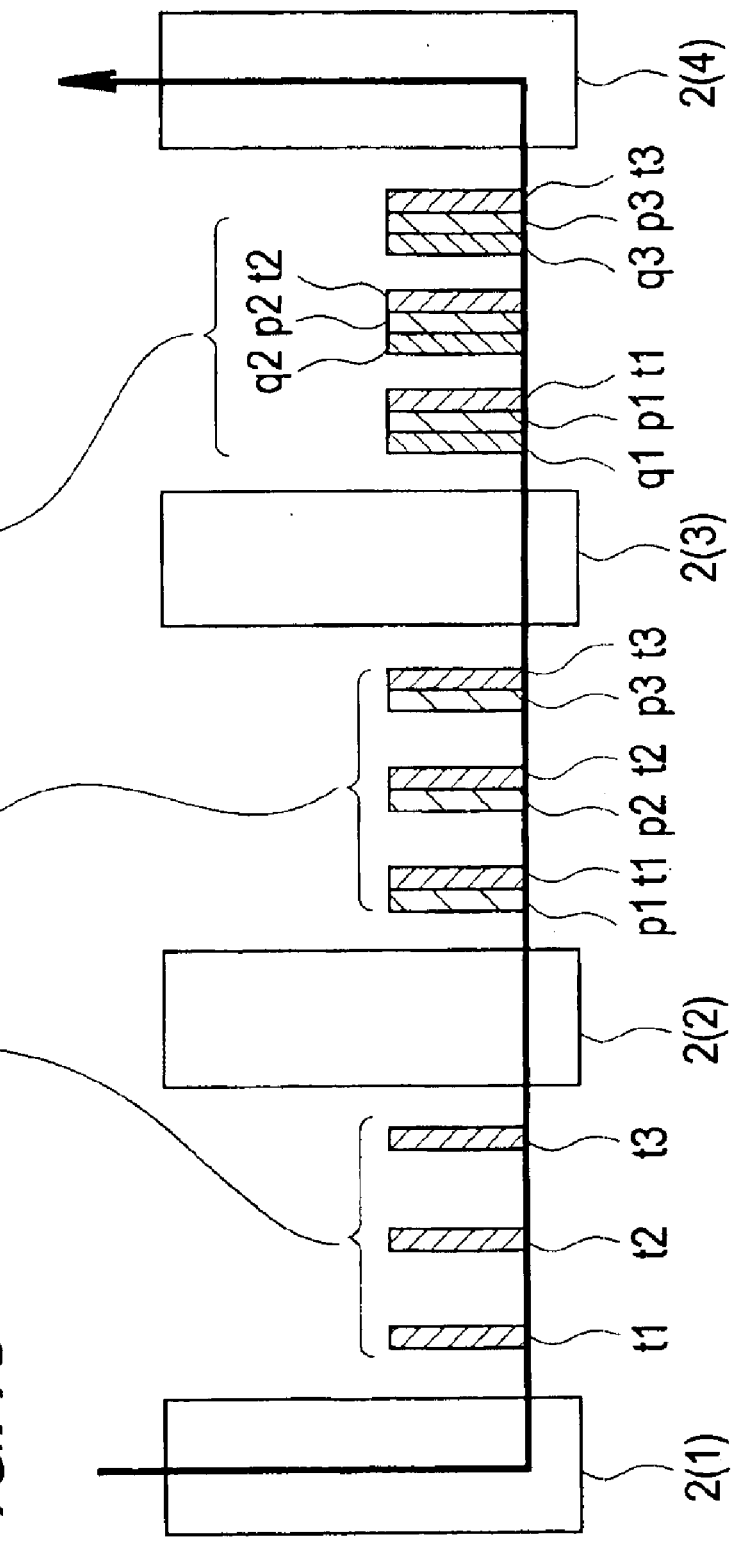
FIG. 13 is a drawing depicting an example of superimposing (overlaying) pilot tone signals for explaining embodiments of the present invention.

The node device 2 in accordance with the present embodiment implements this function by TDM pilot tone transmission function part 2H for the information channel which is disposed in the node device. FIG. 13 shows an example of time division multiplex (TDM) of pilot tone signals. In FIG. 13, with reference to time slots t1, t2 and t3 when the node device 2(1) furthest upstream transmitted pilot tone signals, the node devices 2(2), 2(3) and 2(4) in subsequent stages oaverlay respective information in different time slots (P1, P2, P3; q1, q2, q3) respectively.

In this way, if the node device (node control device, optical path setting method) in accordance with the present embodiment is disposed in the optical network system, information can be transferred without a collision of pilot tone signals occurring.

In the present embodiment, a TDM system is used for the transmission of pilot tone signals, but a transmitter-receiver for pilot tone signals with different frequencies may be provided in each device, so as to enable communication between the node devices by the transmitter-receivers. Here, as a rule, a different frequency for a pilot tone signal is assigned to each node device. However, if a pilot tone signal from another node device received by a node device which distance is sufficiently distant, is noticeably weak, the same frequency may be used in an appropriate spatial arrangement.

(J) Other Embodiments

In the above mentioned embodiments, the case when the layer 3 switch, where packets are transferred or omitted for forwarding based on the layer 3 (network layer) address of the input packet, was described for the node device 2, but the present invention can also be applied to the layer 4 switch where the header information of the layer 4 (transport layer) of the input packet, such as the port numbers of TCP and UDP, is read to transfer packets. In this case, processing for the layer 2 and layer 3 or layers higher than the layer 3 is omitted.

What is claimed is:

1. A node device which is used in an optical network system for transferring a user packet input from outside said optical network system to outside said optical network system through a plurality of said node devices, which arc provided for making an optical path on a transfer route and which functioning as a start point node device, and an end point node device, an intermediate point node device having an optical path to be set in said optical network system device between the start and end point node devices, respectively, the node device comprising:

a router, an optical switch, and a node control device, said node control device including a connection information responding means, and an optical path setting means;

said connection information responding means, when said optical network system has sequentially provided therein a first node device, a second node device, a third node device, and a fourth node device and when said connection information responding means belongs to said second node device:

inquiring said third node device adjacent to said second node device about connection information of said third node device and connection information of said fourth node device adjacent to said third node device each time a predetermined time is elapsed or a predetermined event is generated, and storing the connection information of said third node device and the connection information of said fourth node device; and responding with connection information of said second node device and connection information of said first node device adjacent to said second node device if said second node device receives inquiring about the connection information thereof and the connection information of said first node device; and said optical path setting means, when said second node device functions as said intermediate node device, setting an optical path in said second node device without going through the router included therein based on the connection information of each of said third and fourth node devices acquired using said connection information responding means.

2. The node device according to claim 1, further comprising:

an optical path determination means for determining the necessity of a cut-through in said optical path setting means;

said optical path determination means, when said second node device functions as said start point node device and when said first, third, and fourth node devices function as said intermediate node devices, respectively:

determining the necessity of the setting of an optical path which does not go through the router belonging to any one of said first, third, and fourth node devices based on the connection information of each of said first, third, and fourth node devices, stored by said connection information responding means of said second node device, and instructing the setting of said optical path to any one of said intermediate node devices which correspond to said first, third, and fourth node devices, respectively, and for which the setting of said optical path is determined as necessary.

3. The node device according to claim 1, further comprising:

an information channel insuring means for determining whether any one of said intermediate node devices which correspond to said first, third, and fourth node devices, respectively, and for which the setting of said optical path is required, can insure the information channel even after the setting of said optical path, and setting said optical path only when said information channel can be insured.

4. The node device according to claim 1, further comprising:
an optical cross-connect having provided therein said optical switches for extracting optical signals from an optical fiber, inserting optical signals into an optical fiber, and setting optical paths between input/output optical fibers;
said router receiving a user packet and determining an output destination of said user packet based on header information of upper layer of said user packet; and
said node control device switching a route of the optical paths using the optical switches of said optical cross-connect according to instructions of the received user packet or based on self judgment by said node control device itself.

5. The node device according to claim 4, wherein said optical switch connects a destination-based buffer to at least one output port of the router to said optical cross-connect, and for connecting a user packet read from said destination based buffer to an input port of said optical cross-connect.

6. The node device according to claim 5, wherein said router includes an allowable delay recognition function means for determining the allowable delay of a user packet for direct output of said user packet to one of the optical cross-connect and destination-based buffer according to one of the allowable delay and a packet loss ratio.

7. The node device according to claim 4, further comprising:
an optical path extraction/insertion means provided in said optical cross-connect for an information channel for alternatively extracting optical signals with a fixed wavelength insured for the information channel from the optical fiber, or for inserting said optical signals with a fixed wavelength into the optical fiber for communicating information signals with another node device.

8. The node device according to claim 4, further comprising:
a pilot tone signal super-imposing/receiving means for one of super-imposing pilot tone signals for an information channel on an optical path for user data, and separating pilot tone signals for the information channel from the optical path for communicating information signals with another node device.

9. An optical path setting method for an optical network system for transferring a user packet input from outside said optical network system to outside said optical network system through a plurality of node devices, which are sequentially provided for making an optical path on a transfer route and which function as a start point node device, an end point node device, an intermediate point node device between the start point node and the end point node devices, respectively, each of said node devices comprising a router, an optical switch, and a node control device, and said node control device including a connection information responding means, and an optical path setting means, the method comprising the steps of:
when said optical network system has sequentially provided therein a first node device, a second node device, a third node device, and a fourth node device and when said connection information responding means belongs to said second node device,
said connection information responding means, when said node device functions as said second node device, inquiring said third node device adjacent to said second node device about connection information of said third node device and connection information of said fourth node device adjacent to said third node device each time a predetermined time is elapsed or a predetermined event is generated, and storing the connection information of said third node device and the connection information of said fourth node device, and
responding with connection information of said second node device and connection information of said first node device adjacent to said second node device if said second node device receives inquiries about the connection information thereof and the connection information of said first node device; and
said optical path setting means, when said second node device functions as said intermediate node device, setting an optical path in said second node device without going through the router included therein based on the connection information of each of said third and fourth node devices acquired using said connection information responding means.

10. The optical path setting method according to claim 9, wherein said node control device further comprises an information channel insuring means, the method comprising the steps of:
said information channel insuring means:
determining whether any one of said intermediate node devices which correspond to said first, third and fourth node devices, respectively and for which the setting of the optical path is requested can insure the information channel even after the setting of the optical path, and
setting said optical path only when said information channel can be insured.

11. The optical path setting method according to claim 9, further comprising the steps of:
reading a packet from the destination-based buffer provided between said router and said optical switch; and
transmitting the packet to the optical path set by said optical path setting means.

12. The optical path setting method according to claim 11, further comprising the step of:
storing the packets in said destination-based buffer based on one of an allowable delay time and a packet loss ratio.

13. The optical path setting method according to claim 9, further comprising the steps of:
communicating between the node devices where the optical path is set; and
using optical signals with a wavelength insured for an information channel after said optical path is set.

14. The optical path setting method according to claim 13, further comprising the steps of:
communicating between the node devices where the optical path is set; and
super-imposing pilot tone signals for an information channel on the optical path for user data even if said optical path is set.

15. A node device in an optical network system including a first node device, a second node device connected thereto through an optical fiber, and a third node device connected thereto through an optical fiber, the node device functioning as said second node device transferring a user packet input from outside said optical network system to said third node device through said second node device, each of said node devices comprising:

a router, an optical switch, and a node control device;

said node control device including a connection information responding means, and an optical path setting means, said connection information responding means inquiring of said third node device adjacent to said second node device about connection information of said third node device and connection information of another node device adjacent to said third node device each time a predetermined time is elapsed or a predetermined event is generated, and storing the connection information of said third node device and the connection information of said another node device as a network connection information; and said optical path setting means setting an optical path from said first node device to said third node device through said second node device without going through the router included therein based on said network connection information acquired using said connection information responding means.

16. A node device for use in an optical network system which transfers a user packet across an optical path, said optical network system including a plurality of node devices directly or indirectly connected by optical fibers, each of said node devices comprising:

a router;

an optical cross-connect coupled to said router; and a node control device coupled to said router and said optical cross-connect, said node control device including:

a connection information response part; and an optical path setting part, wherein the connection information response part of each node device:

(1) exchanges connection information with each adjacent node device to which it is directly coupled by an optical fiber; and (2) receives connection information from and transmits connection information to each node device to which it is not directly coupled by an optical fiber, said connection information being received and provided to each node device via an adjacent node device to which it is directly coupled, whereby each of the plurality of node devices contains all of the connection information; and wherein, when a user packet is inputted to a given node device, the optical path setting part of said given node device:

(1) determines, based on an analysis of the user packet provide by the router of said given node device, a preferred path to the destination of the packet based on the connection information stored in said given node device; and (2) requests the node devices located along said preferred path to set said preferred path.

17. The node device according to claim 16, wherein the connection information response part of said node control device initiates an exchange of information with each adjacent node device after a predetermined time elapses or after a predetermined event has been generated.

18. The node device according to claim 16, wherein said node control device further comprises a cut-through optical path necessary/unnecessary determination part, said necessary/unnecessary determination part determining the necessity of establishing a cut-through optical path before the optical setting part of said given node device determines a preferred path to the destination of the packet, and selectively sets the cut-through optical path only when it is necessary.

19. The node device according to claim 16, further comprising:

a plurality of destination-based buffers coupled between said router and a switch function part, at least one of said plurality of destination-based buffers stores user packets received from at least one user terminal, and when a predetermined number of said user packets are stored in said at least one destination-based buffer, said optical path setting part establishes a cut-through path from the node device to a destination node device, said at least one destination-based buffer transfers said user packets to said switch function part, which transmits said user packets to said cut-through path, and when all of said user packets have been transmitted from said at least one destination-based buffer across said cut-through path, said cut-through path is released and a different cut-through path is established to transmit user packets stored in a different one of said plurality of destination-based buffers.

20. The node device according to claim 19 further comprising:

an allowable delay recognition part coupled to said router, said allowable delay recognition part determines if said user packets are for a real-time application or a non-real-time application, and at least one of said plurality of destination-based buffers stores said user packets if said allowable delay recognition part determines said user packets are for a non-real-time application.

21. The node device according to claim 19, wherein said plurality of destination-based buffers are classified according to quality classes of said user packets.

22. The node device according to claim 16, said node control device further comprising:

an information channel insuring part included in the node control device that insures an optical path will be set as an information channel between the node device and at least one adjacent node device, said information channel carries control signals between the node device and said at least one adjacent node device.

23. The node device according to claim 22, wherein the node control device establishes a cut-through optical path after said information channel insuring part determines that said information channel will be available after setting said cut-through optical path.

24. The node device according to claim 16, said node control device further comprising:

a pilot tone signal transmission part adding a pilot tone signal as an information channel to a cut-through optical path, said pilot tone signal transmission part transmits said pilot tone signal containing control information between the node device and at least one adjacent node device.

25. The node device according to claim 24, wherein the node device transmits an acknowledgement (ACK) signal after receiving said pilot tone signal.

26. The node device according to claim 24, wherein pilot tone signals from a plurality of node devices on said cut-through optical path are time division multiplexed to prevent collisions between said pilot tone signals.

27. The node device according to claim 16, wherein said node device allocates a dedicated optical path as an information channel, said dedicated optical path uses a dedicated optical wavelength.

28. An optical network system for transferring a user packet across an optical path, said optical network system including a plurality of node devices directly or indirectly connected by optical fibers, each of said node devices comprising:

a router;

an optical cross-connect coupled to said router; and a node control device coupled to said router and said optical cross-connect, said node control device including:
- a connection information response part; and
- an optical path setting part, wherein the connection information response part of each node device:
  (1) exchanges connection information with each adjacent node device to which it is directly coupled by an optical fiber; and
  (2) receives connection information from and transmits connection information to each node device to which it is not directly coupled by an optical fiber, said connection information being received and provided to each node device via an adjacent node device to which it is directly coupled, whereby each of the plurality of node devices contains all of the connection information; and wherein, when a user packet is inputted to a given node device, the optical path setting part of said given node device:
  (1) determines, based on an analysis of the user packet provide by the router of said given node device, a preferred path to the destination of the packet based on the connection information stored in said given node device; and
  (2) requests the node devices located along said preferred path to set said preferred path.

* * * * *